US012586976B2

(12) United States Patent
Kane et al.

(10) Patent No.: US 12,586,976 B2
(45) Date of Patent: Mar. 24, 2026

(54) TUNABLE MICROCHIP LASER AND LASER SYSTEM FOR RANGING APPLICATIONS

(71) Applicants: Thomas James Kane, Menlo Park, CA (US); John Lawrence Nightingale, Portola Valley, CA (US)

(72) Inventors: Thomas James Kane, Menlo Park, CA (US); John Lawrence Nightingale, Portola Valley, CA (US)

( * ) Notice: Subject to any disclaimer, the term of this patent is extended or adjusted under 35 U.S.C. 154(b) by 984 days.

(21) Appl. No.: 17/744,705

(22) Filed: May 15, 2022

(65) Prior Publication Data

US 2022/0368099 A1     Nov. 17, 2022

Related U.S. Application Data

(60) Provisional application No. 63/189,210, filed on May 16, 2021.

(51) Int. Cl.
| | |
|---|---|
| *G01S 3/08* | (2006.01) |
| *G01S 7/481* | (2006.01) |
| *G01S 7/4865* | (2020.01) |
| *H01S 3/0941* | (2006.01) |
| *H01S 3/13* | (2006.01) |
| *H01S 3/131* | (2006.01) |
| *H01S 3/139* | (2006.01) |

(52) U.S. Cl.
CPC .......... *H01S 3/1305* (2013.01); *G01S 7/4814* (2013.01); *G01S 7/4865* (2013.01); *H01S 3/09415* (2013.01); *H01S 3/1312* (2013.01); *H01S 3/1394* (2013.01)

(58) Field of Classification Search
CPC .. H01S 3/1305; H01S 3/09415; H01S 3/1312; H01S 3/1394; G01S 7/4814; G01S 7/4865
See application file for complete search history.

(56) References Cited

U.S. PATENT DOCUMENTS

| | | | | |
|---|---|---|---|---|
| 4,969,150 A | * | 11/1990 | Esterowitz | H01S 3/106 |
| | | | | 372/105 |
| 5,265,116 A | * | 11/1993 | Mooradian | H01S 3/09415 |
| | | | | 372/71 |
| 5,892,586 A | | 4/1999 | Thony | |
| 6,047,012 A | | 4/2000 | Nerin | |
| 6,055,815 A | | 5/2000 | Peterson | |
| 6,785,307 B2 | * | 8/2004 | von Kopylow | H01S 3/1062 |
| | | | | 372/20 |
| 7,254,148 B2 | * | 8/2007 | Masuda | H01S 3/113 |
| | | | | 372/29.02 |
| 8,837,535 B2 | | 9/2014 | Spiekermann | |

(Continued)

FOREIGN PATENT DOCUMENTS

| | | |
|---|---|---|
| EP | 2109921 | 10/2009 |

OTHER PUBLICATIONS

Zayhowski, J. J. , A Mooradian "Frequency-modulated Nd:YAG microchip lasers", Optics Letters, vol. 14, No. 12, p. 618 (1989).

(Continued)

*Primary Examiner* — Mark Hellner

(57) ABSTRACT

A frequency modulated, continuous wave (FMCW) laser using a microchip gain medium, an optical coupling element, and a tuning element is described. The laser may be part of a coherent laser ranging system.

19 Claims, 9 Drawing Sheets

(56) References Cited

U.S. PATENT DOCUMENTS

| 8,948,220 | B2 | 2/2015 | Spiekermann | |
|---|---|---|---|---|
| 9,515,448 | B2 * | 12/2016 | Stultz | H01S 3/113 |
| 10,838,047 | B2 | 11/2020 | Chong | |
| 11,054,523 | B1 | 7/2021 | Buchter | |
| 2017/0123052 | A1 | 5/2017 | Hinderling | |
| 2020/0076152 | A1 | 3/2020 | Eichenholz | |
| 2020/0412080 | A1 | 12/2020 | Kane | |

OTHER PUBLICATIONS

Keszenheimer. J.A., Wall, K.F. and Root, S.F., "A miniature Nd:YAG microchip laser operating at 1.06 microns is demonstrated that uses a composite intracavity electro-optic modulator for rapid frequency tuning", Advanced Solid-State Laser Conf., Optical Society of America, p. 283 (1993).

Thony, PH., P. Labeye, V. Marty, R. Templier, P. Besesty, and E. Molva, "1 μm single-frequency tunable microchip lasers for range finding" OSA Trends in Optics and Photonics (Optica Publishing Group, 1999), paper ME8 (1999).

Besesty, P., P. Labeye, and P. Thony, "Compact FMCW advanced laser range finder", Conf. on Lasers and Electrooptics, Optical Society of America, paper CFK2 (1999).

Hodgson, Norman and Horst Weber, Single Mode Resonators, chapter 22 in: Laser Resonators and Beam Propagation. Springer Series in Optical Sciences, vol. 108. Springer, New York, NY. p. 675-686 (2005).

* cited by examiner

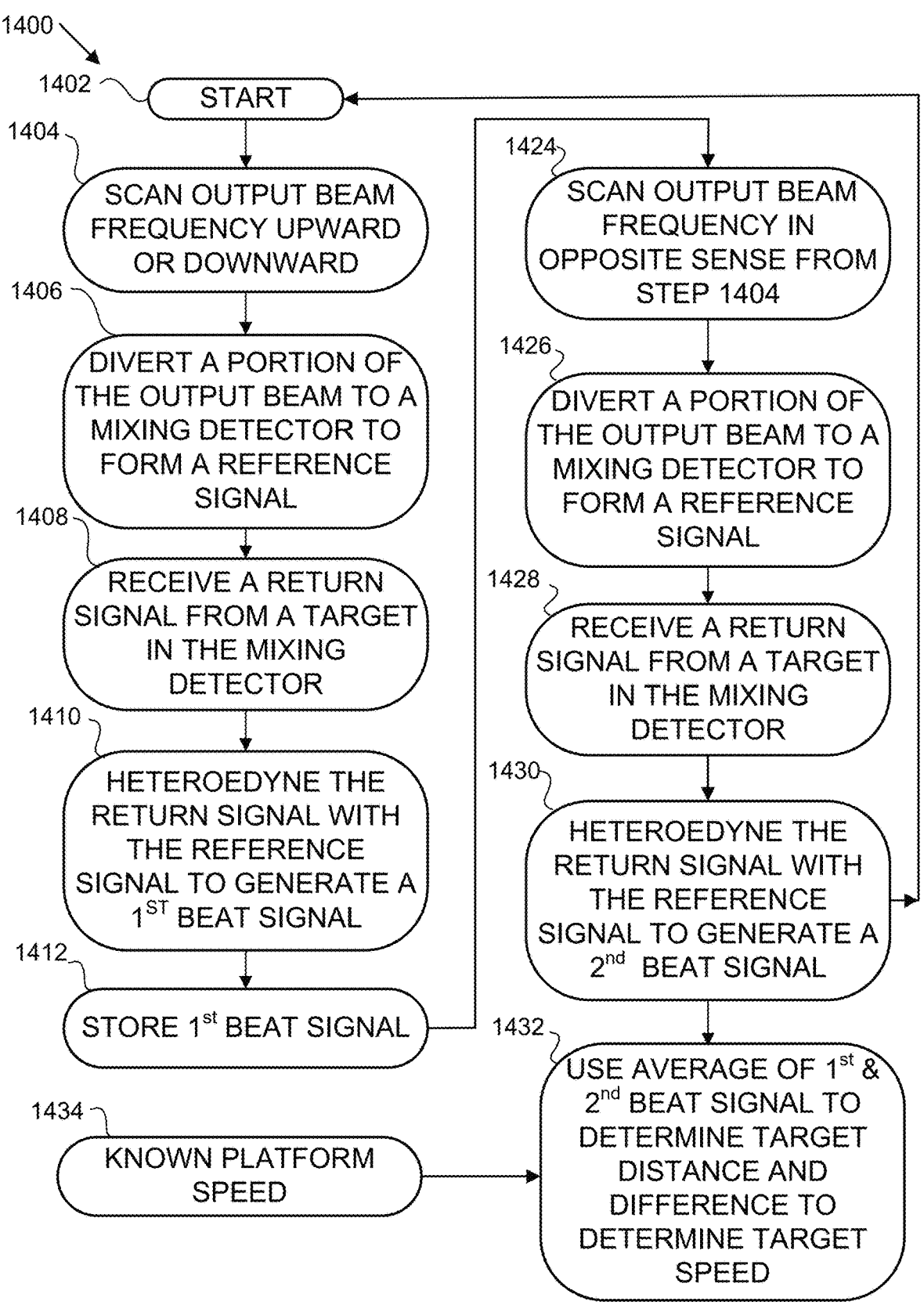

1400

1402 START

1404 SCAN OUTPUT BEAM FREQUENCY UPWARD OR DOWNWARD

1406 DIVERT A PORTION OF THE OUTPUT BEAM TO A MIXING DETECTOR TO FORM A REFERENCE SIGNAL

1408 RECEIVE A RETURN SIGNAL FROM A TARGET IN THE MIXING DETECTOR

1410 HETEROEDYNE THE RETURN SIGNAL WITH THE REFERENCE SIGNAL TO GENERATE A 1ST BEAT SIGNAL

1412 STORE 1st BEAT SIGNAL

1434 KNOWN PLATFORM SPEED

1424 SCAN OUTPUT BEAM FREQUENCY IN OPPOSITE SENSE FROM STEP 1404

1426 DIVERT A PORTION OF THE OUTPUT BEAM TO A MIXING DETECTOR TO FORM A REFERENCE SIGNAL

1428 RECEIVE A RETURN SIGNAL FROM A TARGET IN THE MIXING DETECTOR

1430 HETEROEDYNE THE RETURN SIGNAL WITH THE REFERENCE SIGNAL TO GENERATE A 2nd BEAT SIGNAL

1432 USE AVERAGE OF 1st & 2nd BEAT SIGNAL TO DETERMINE TARGET DISTANCE AND DIFFERENCE TO DETERMINE TARGET SPEED

*FIG. 12*

TUNABLE MICROCHIP LASER AND LASER SYSTEM FOR RANGING APPLICATIONS

CROSS REFERENCE TO RELATED APPLICATIONS

This application claims priority to U.S. Provisional Patent Application No. 63/189,210, entitled "TUNABLE MICRO-CHIP LASER AND LASER SYSTEM FOR RANGING APPLICATIONS," filed May 16, 2021 which is incorporated herein in its entirety for all purposes.

FIELD OF THE INVENTION

The present invention relates to methods and systems for a laser ranging system using a frequency-modulated continuous-wave (FMCW) microchip laser.

BACKGROUND

An important use of lasers is for ranging, that is, determining the distance from a laser to a target. Laser ranging systems are commonly referred to by the acronym LIDAR (Light Detection and Ranging). Many LIDAR systems use a laser that emits a short duration light pulse. The ranging system collects a small amount of that light pulse that reflects off of a distant target with a detector co-located with the laser. The time of flight, when multiplied by the speed of light, gives the round-trip distance of the light. One half of this round-trip distance is the distance to the target.

Another way to measure distance is to use light from a frequency-modulated continuous wave, or FMCW, laser. The laser is scanned in optical frequency with a sufficient modulation depth to create a measurable change in optical frequency in the round-trip time of the light from the laser to the target and back. Light returned from the target is mixed with light directly from the laser. The two light signals have a different frequency, and this difference in frequency can be easily measured using heterodyne detection. The difference in frequency is related to the round-trip time, so the distance can be inferred from the frequency difference. Typically, the tuning is alternated between increasing frequency and decreasing frequency, in a so-called triangle wave pattern. One full cycle of the triangle wave typically corresponds to a single measurement.

In many applications, the FMCW measurement technique has advantages over the time-of-flight measurement technique. One advantage is the ability to measure both distance and velocity simultaneously, since the use of a triangle wave modulation pattern results in the ability to independently determine the Doppler shift, due to velocity, and the time-delay shift, due to distance. Another advantage is the excellent inherent sensitivity of heterodyne detection. A further advantage is the extremely narrow spectral and spatial acceptance of the heterodyne detection technique, which greatly reduces the chance of two nearby laser ranging systems interfering with each other.

Recently, interest in laser ranging has greatly increased due to the advent of autonomous or semi-autonomous vehicles. Autonomous vehicles can create a model of the outside world partly from cameras, but the use of laser ranging greatly enhances the reliability of these models. In order to get a constantly updated 3-D model of a vehicle's surrounding environment, a high measurement rate is needed, such as a million measurements per second. This allows au updated model to be formed many times per second, with hundreds of thousands of pixels in the model.

For an FMCW system to make a million measurements per second, the laser frequency must make a complete cycle one million times per second. That is, the cycle time of the modulated optical frequency for this particular system must be one microsecond.

Additional requirements for the laser include operation at a single optical frequency at any instant; high stability of the optical frequency, also described as long coherence length; a wavelength which creates a minimal eye hazard; and adequate output power, typically many tens of milliwatts, at a minimum in many applications. In addition, the laser should be inexpensive and robust.

There are semiconductor lasers which can meet some of these requirements, but these lasers are not yet easy to make at low cost, they have limited power, and they often have short coherence lengths, that limit their accuracy in ranging applications.

Solid-state lasers pumped by a semiconductor laser can be small and inexpensive. For example, green laser pointers are about the size of a pencil and are relatively inexpensive. An FMCW microchip laser can have a part-for-part correspondence with a green pointer laser, and thus these lasers can be produced inexpensively.

What is needed is a single-frequency continuous-wave laser which can be modulated in optical frequency over a wide frequency scan rate with sufficient frequency modulation depth. The laser should be mechanically simple and low-cost. The laser output should pose a minimal eye hazard.

SUMMARY

A variety of laser resonators, lasers, and laser ranging systems are described. Methods of operating these elements and systems to determine a distance between a laser ranging system and a target are also described.

In an embodiment, a laser system having a resonator with a first and opposed second end is described. The laser system includes a gain element positioned in the resonator having a first and an opposed second surface. The first surface of the gain element has a reflective coating at a lasing wavelength to form the first end of the resonator. The laser system further includes an output coupling element having a first and an opposed second surface. One of the first or second surfaces has a partially reflective coating at the lasing wavelength to form the second end of the resonator. The laser system further includes a tuning element arranged to vary an optical path length between the first and second end of the resonator and a semiconductor laser arranged to generate a pump beam directed into the gain element. A beam splitter is arranged to split off a portion of an output beam of the resonator. A monitor is arranged to intercept the split-off portion of the output beam to provide an electrical signal proportional to an optical power incident on the monitor. The laser system further includes a controller having the electrical signal as an input into the controller. The controller is arranged (i) to supply a modulation voltage to the tuning element to scan a frequency of the output beam (ii) to supply an offset voltage to the tuning element to maintain single frequency operation of the laser system over the frequency scan of the output beam caused by application of the modulation voltage, and (iii) to vary a drive current to the semiconductor laser in a feed forward manner to improve an amplitude stability of the output beam.

In another embodiment, a resonator having a first and an opposed second end and configured to emit an output beam is described. The laser system includes a gain element positioned in the resonator having a first and an opposed second surface. The first surface of the gain element has a reflective coating at a lasing wavelength to form the first end of the resonator. The laser system further includes an output coupling element having a first and an opposed second surface. One of the first or second surfaces has a partially reflective coating at the lasing wavelength to form the second end of the resonator. A nonlinear optical element situated in the cavity arranged to damped relaxation oscillations. A tuning element arranged to vary an optical path length between the first and second end of the resonator. The laser system further includes a multiple emitter pump source configured to generate a plurality of pump beams that spatially overlap in a common pump spot in the gain element to form a combined pump beam. A beam splitter is arranged to split-off a portion of an output beam of the resonator and a monitor arranged to intercept the split off portion of the output beam so as to provide an electrical signal proportional to an optical power incident on the monitor. The laser system further includes a controller, wherein the controller is arranged move the optical coupling element relative to the gain element and thereby scan a frequency of the output beam.

In yet another embodiment, a laser system having a resonator with a first and an opposed second end and configured to emit an output beam is described. The laser system includes a gain element positioned in the resonator having a first and an opposed second surface. The first surface of the gain element has a reflective coating at a lasing wavelength to form the first end of the resonator. The laser system further includes an output coupling element having a first and an opposed second surface. One of the first or second surfaces has a partially reflective coating at the lasing wavelength to form the second end of the resonator. The laser system further includes a tuning element configured as a piezoelectric element arranged to vary an optical path length between the first and second end of the resonator. The mass of the optical coupling element is a range between approximately 0.01 to 2 milligrams. The laser system further includes an edge-emitting laser diode arranged to generate a pump beam directed into the gain element. The laser system further includes a controller that is arranged to move the optical coupling element relative to the gain element and thereby scan a frequency of the output beam.

In still other embodiments, a laser ranging system is mounted on a platform. The laser ranging system includes a frequency-modulated continuous-wave laser. The platform may be a moving platform or may be a stationary platform. The laser beam is scanned so that a distance between multiple targets in the field of view may be determined.

BRIEF DESCRIPTION OF THE DRAWINGS

The invention and the advantages thereof, may best be understood by reference to the following description taken in conjunction with the accompanying drawings in which:

FIG. 12 is a flowchart depicting a method of measuring a distance to a target and speed of the target according to an embodiment of the current invention.

In the drawings, like reference numerals are sometimes used to designate like structural elements. It should also be appreciated that the depictions in the figures are diagrammatic and not to scale.

DETAILED DESCRIPTION

The present invention relates to methods and systems for a laser ranging system using a frequency-modulated continuous-wave (FMCW) microchip laser. The laser can be described as a resonator with two opposing ends. A gain element is situated in the resonator and an optical path length between the two resonator ends may be varied by a tuning element. The gain element may be described as a microchip because it may take the shape of a small rectangular parallelopiped, i.e. a microchip. The microchip dimensions may be on the order of or less than a mm in all dimensions. The tuning element may be controlled by a control signal. By varying the optical path length between the two ends of the resonator, the frequency of an output laser beam may be scanned. In some embodiments, the microchip laser is a diode-pumped continuous-wave laser which is modulated in frequency by changing an optical path length in the microchip laser. The optical path length may be varied by extending or contracting a distance separating the two opposing ends of the resonator. Alternatively, the optical path length between the two resonator ends may be varied by applying a voltage across an electrooptic element in the resonator. Many design approaches, which optimize this type of laser for ranging, are described below.

In some embodiments, the present invention relates to methods and systems for a laser ranging system using an eye-safe laser. The laser may operate at wavelengths between 1.2 and 1.4 microns, which is a particularly eye-safe region. The laser can be described as a diode-pumped neodymium laser, operating at a wavelength in the range from 1.2 μm to 1.4 μm. The eye-safe laser may be a continuous wave (cw) laser that has its output frequency scanned or chirped.

Figure 1:
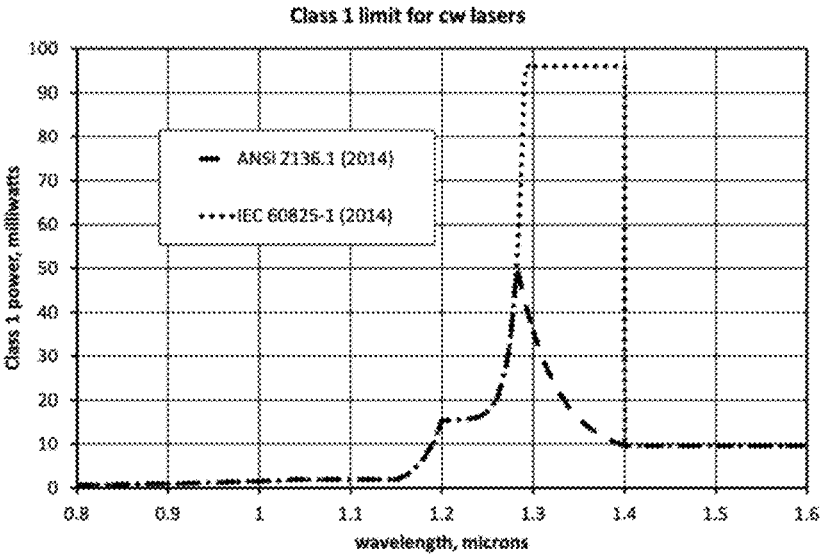
FIG. 1 is a plot of the allowable average power vs. wavelength for a Class 1 (eye-safe) laser.

For operation in an open uncontrolled environment, it is important that a laser ranging system be eye safe. Eye safety exists when an observer who is looking in the direction of the laser source of the laser ranging system will experience no eye damage as a result of exposure to the laser radiation. An eye safe level of laser power varies with the laser wavelength. Various standards have been established for what constitutes an eye safe laser. FIG. 1 plots the allowable laser power limit for an eye safe, class 1, laser as a function of laser wavelength. There are two standards plotted, the IEC and the ANSI standard. They generally overlap but differ somewhat in the wavelength range between 1.28 μm and 1.4 μm. Both standards indicate that the wavelength range having the highest allowable eye safe power level is between 1.2 and 1.4 microns. The highest allowable power corresponds to wavelengths near 1.3 microns. For this wavelength, the IEC standard allows continuous-wave laser powers as high as 95 mW and the ANSI standard allows laser powers as high as approximately 40 mW. The values of FIG. 1 apply to a beam which is a near-ideal ray of light. For beams which are spread out, or quickly scanned, as is the case for ranging systems, higher levels of power are considered to be safe, but still the 1.2-1.4 μm range permits the most power.

Figure 2:
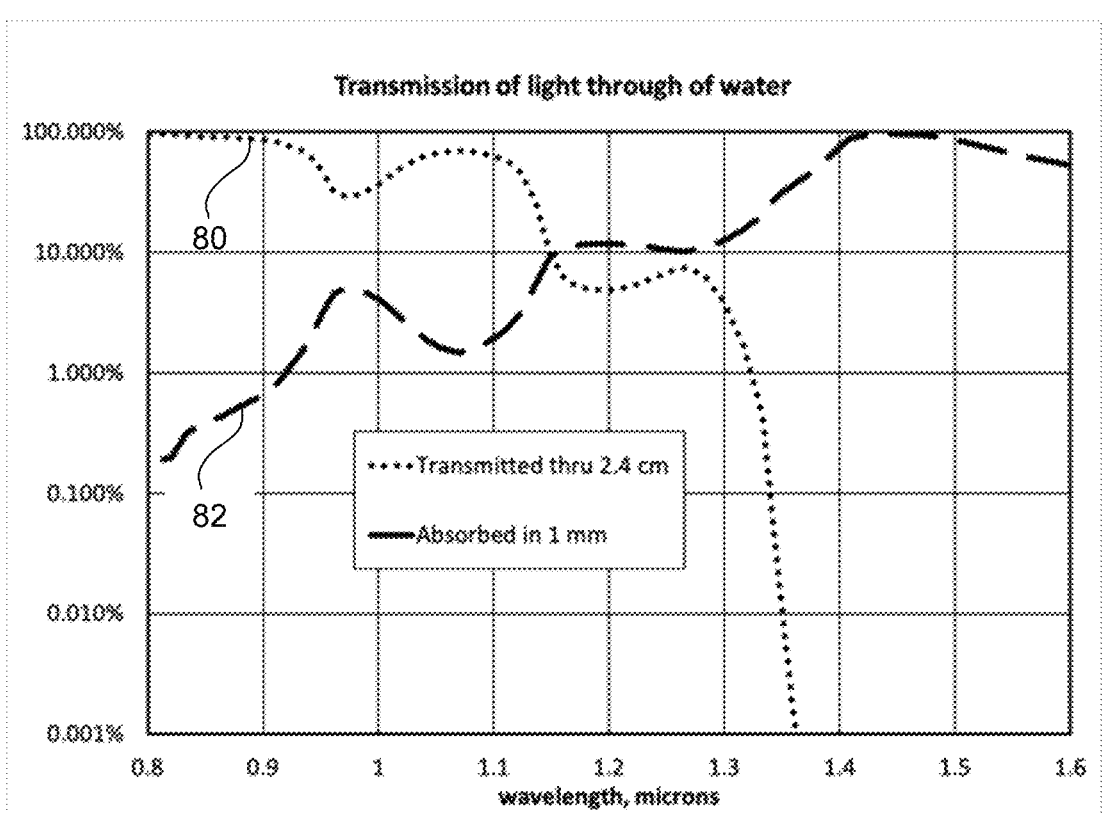
FIG. 2 is a plot of water transmission and absorption vs. wavelength.

The physical basis for the laser safety standards depicted in FIG. 1 is the threshold for damaging the retina or other eye tissue of an observer looking directly at an incoming laser beam. For many wavelengths, such as visible wavelengths, eye tissue is transparent, and incoming light is transmitted to and focused on the retina. As a result, very low optical power levels can burn a spot on the retina resulting in permanent eye damage. Referring back to FIG. 1, the allowable limit for an eye safe power begins to rise significantly for laser wavelengths longer than approximately 1.15 microns. Wavelengths longer than approximately 1.2 microns are known as eye-safe wavelengths. This is a result of absorption of these wavelengths in the eye tissue between the eye's outer surface and the retina. This absorption is dominated by water absorption in the eye tissue. FIG. 2 illustrates water absorption as a function of wavelength.

FIG. 2 shows a curve 80 that plots a fraction of light which is transmitted through a 2.4-cm thick object made of water. The human eye is well modeled by such an object. Humans of all ages have the same size eyes; there is essentially no eye growth after birth. Note that at the deep red wavelength of 0.7 μm essentially all of the light is transmitted. At 1.2 μm it is down to 5%. At 1.4 μm it is essentially 0%, and no light reaches the retina.

FIG. 2 also shows in curve 82 a fraction of light absorbed in the first 1 mm of an object made of water. For wavelengths above 1.4 μm, essentially all of the light is absorbed in this first millimeter.

The advantage of the wavelength range from 1.2 μm to 1.4 μm is that while little of the light passes through 2.4 cm of water and reaches the retina, the light absorption is also not concentrated in the first millimeter. These wavelengths are safer for both the retina and for the eye's outer surface, because light absorption is distributed over the bulk of the eye.

Figure 3:
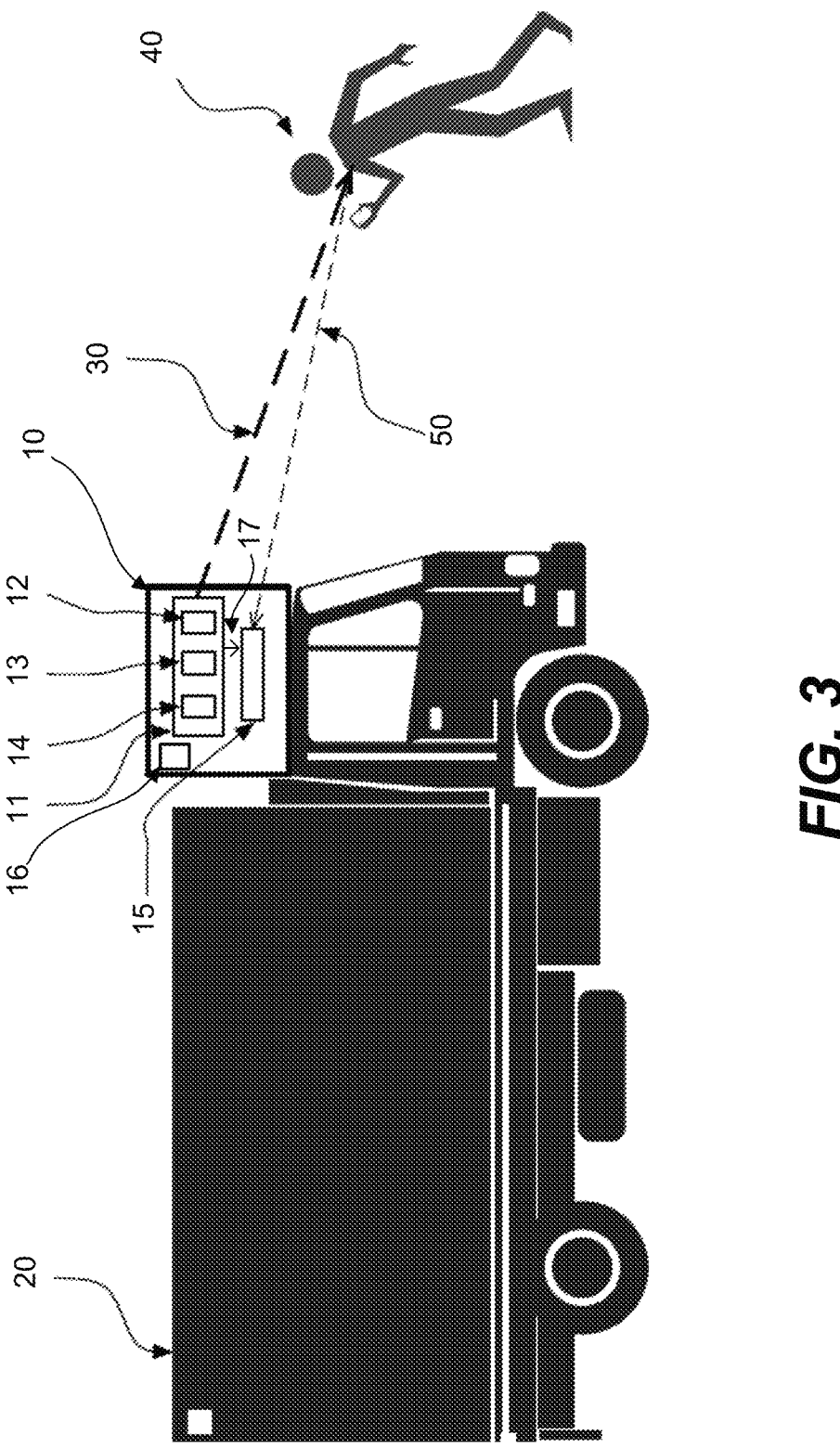
FIG. 3 is a schematic diagram of an exemplary laser ranging system using an eye-safe laser.

FIG. 3 shows a representative laser ranging system according to an embodiment of the present invention. The ranging system 10 may be mounted on a platform 20, such as a vehicle. The vehicle may be under human control or may be autonomous or semi-autonomous. The vehicle 20 and ranging system 10 may operate in an open environment, from which wildlife and humans are not excluded, such as a roadway. The vehicle 20, such as a truck or automobile operating at freeway speeds, needs to get useful range data at distances exceeding 1000 feet. If the vehicle is traveling at 70 mph, the time to travel 1000 feet is less than 10 seconds. The ranging system 10 includes a laser 11. The laser 11 includes a gain element 13 which may have as its active dopant neodymium ions or some other ion capable of lasing. The wavelength range may be between approximately 1.2 and 1.4 microns or it may be between 1.0 to 1.1 microns. Neodymium ions in various host materials have lasing wavelengths within these ranges. Power to pump the gain element 13 may be provided by a semiconductor laser 14. The semiconductor laser may operate in a continuous manner or the pump power delivered to the gain element 13 may be varied as desired. The laser 11 may emit an output beam 30 in the wavelength range from 1.2 μm to 1.4 μm.

A monitor 12 may sense emission of a laser and provide a signal indicative of its emission. The target 40 to be measured by the ranging system 10 may include humans with unprotected eyes. Light beam 30 emitted by the laser 11 may strike the target 40 and be scattered and reflected. Some of the scattered and reflected light 50 returns to a mixing detector 15, which may be co-located with the laser 11 within the ranging system 10. The reflected light 50 may be considered as a return signal from the target 40. The reflected light may return along an optical path identical or close to that of the laser beam 30. A reference beam 17 may also be incident on the mixing detector 15. The reference beam 17 and return signal 40 are mixed in mixing detector 15 so that the mixing detector generates a heterodyned output signal, which has a frequency that is the difference between the return signal 50 and reference beam 17. In some embodiments, the monitor 12 and the mixing detector 15 may be a common element.

The laser 11 may operate in a cw manner and its frequency may be scanned. As previously disclosed, the mixing detector 15 heterodynes the return signal 50 with a signal from the laser 11, resulting in a heterodyned or beat signal having a frequency representing a difference between the reflected light frequency and the current laser frequency. Since the change in frequency with time is known, the transit time between the ranging system 10 to the target 40 and back to the ranging system 10 is known. Using the known speed of light this allows a distance between the laser ranging system 10 and the target 40 to be determined.

There may be multiple targets in the field view and the processor 16 may be configured to discern the nature of the different targets in the field of view. Alternatively, the output beam 30 may flood illuminate a large area and spatial resolution is obtained by having multiple detectors that measure the reflected light over different portions of the illuminated area. In other embodiment, the output beam 30 may be arranged as a line source which is scanned in a direction perpendicular to the line of illumination.

Motion of the target 40 may be determined by comparing the heterodyne frequency on upward and downward scans of the laser frequency. If the target 40 is moving with some velocity component parallel to the direction of the output beam 30 the return signal 50 from the target 40 will be frequency shifted due to the Doppler effect. By frequency scanning the laser in an upward direction and downward direction a difference in the frequency of the heterodyne signal between the upward and downward scan can be determined. This frequency difference can be used to determine a speed the target 40 is moving toward or away from the platform 20.

It should be also appreciated that any of the methods or operations described herein may be stored in a suitable computer readable medium in the form of executable computer code. The executable computer code can be stored in a memory that can include a non-transitory computer-readable medium on which instructions for performing all the methods and functions disclosed can be stored. The term "non-transitory computer-readable medium" can include a single medium or multiple media that store instructions, and can include any mechanism that stores information in a form readable by a computer, such as read-only memory (ROM), random-access memory (RAM), erasable programmable memory (EPROM and EEPROM), or flash memory.

The operations are carried out when the processor 16 executes the computer code. The processor 16 may determine a distance between the platform 20 and the target 40. The processor 16 may cause a cw laser 11 mounted on the platform 20 to scan its output frequency. The processor 16 may use a detected frequency difference between a current laser frequency and a frequency of a return signal 50 from the target 40 to determine distance to the target 40 and target motion.

Aside from the basic functionality of determining target distance and motion, the processor 16 may also include logic that can discriminate between reflected signals from the target 40 and background noise that may be present in the environment. For example, other laser ranging systems may be in the vicinity and may be emitting laser beams at substantially the same wavelength. The processor 16 may be configured to identify these background signals and disregard them. The processor 16 may also direct the laser 11 to operate at a different center frequency, to scan at a different rate, or to scan over a different frequency range. Varying the laser output in a controlled manner may help to discriminate against background noise. In particular, the resonator optical path length may be varied using a tuning element so that the laser 11 operates within a desired operating range.

Figure 4:
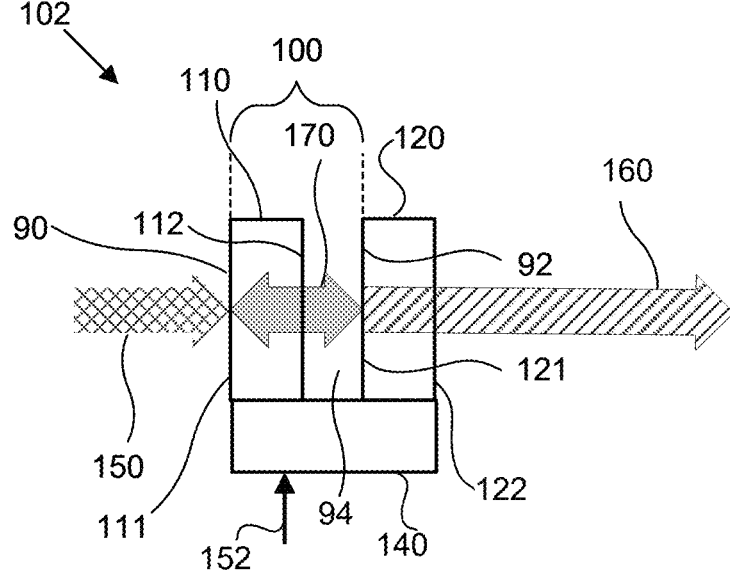
FIG. 4 is a schematic diagram of a frequency-modulated, continuous-wave microchip laser according to an embodiment of the current invention.

FIG. 4 is a schematic diagram of a frequency-modulated, continuous-wave microchip laser system 102 according to an embodiment of the current invention. The laser system 102 includes a laser having a resonator 100 with a first end 90 and an opposed second end 92, which forms the resonant cavity essential for laser operation. The laser includes a pump source (not shown in FIG. 4) to direct pump energy 150 into the resonator 100. A control signal 152 is arranged to adjust a resonator parameter to control a characteristic of an output beam 160 of the laser. Specifically, the control signal 152 may vary a tuning element 140 that controls an optical path length between the two ends 90 and 92 of the resonator 100. Varying the optical path length between the resonator ends will vary an output frequency of the output beam 160.

Pump energy 150 may be input into a gain element 110. The pump energy 150 may be optical energy or electrical energy depending on the form of gain element 110. The gain element 110 has a first surface 111 and an opposed second surface 112. The first surface 111 may be highly reflecting at a lasing wavelength and form the first end 90 of the resonator 100. The second surface 112 of the gain element 110 may be highly transmitting at the laser wavelength. An output coupling element 120 that forms the second end 92 of the resonator 100 may be separated from the gain element 110 by a gap 94. The output coupling element 120 may have a first surface 121 and an opposed second surface 122 with the first surface 121 located closer to the gain element 110 than the second surface 122. The first surface 121 may be partially transmitting at the lasing wavelength and may form the second end 92 of the resonator 100. The second surface 122 may be anti-reflection coated at the laser wavelength. Alternatively, the second surface 122 may form the second end 92 of the resonator 100 and the first surface 121 may be anti-reflection coated at the laser wavelength. Resonant light 170 circulates between the first and second resonator ends 90 and 92 when the resonator 100 is lasing. The resonator optical path length between the resonator first end 90 and second end 92 is the physical distance multiplied by the refractive index of any material through which the resonant beam 170 propagates. For example, the physical length of the resonator 100 may be 2 mm. The gain element 110 may be neodymium-doped yttrium orthovanadate (Nd:YVO$_4$) having a refractive index of approximately 2.15 for light polarized along the extraordinary axis of the Nd:YVO$_4$ crystal. The length of the gain element 110 may be 1 mm, so the optical path length through the gain element is 2.15 multiplied by 1 mm or approximately 2.15 mm. If the remaining space in the gap 94 is air or some other gas, with a refractive index of approximately 1, the resonator optical path length is approximately 3.15 mm, the sum of the path length in the gain element 110 and the gap 94. The round-trip optical path length is twice this value or 6.3 mm in this example. It should be appreciated that the resonator optical path length may be shorter or longer than the value given in this example.

A tuning element 140 may provide a mechanical connection between the gain element 110 and the output coupling element 120. The length of the tuning element 140 may be varied by application of a control signal 152. By changing the length of tuning element 140 the length of the gap 94 changes and the resonator optical path length may be scanned. Changing the optical path length of the resonant light beam 170 changes the optical frequency of the output beam 160 by an equal fractional amount. Though the fractional amounts are the same, the signs are opposite; when the resonator length gets longer, the optical frequency gets smaller.

If the pump energy 150 is optical energy, the first surface 111 of the gain element 110 may be highly transmitting at a pumping wavelength of the pump energy 150. In one embodiment, pump energy may be a laser beam at a wavelength between 750 and 950 nm produced by a semiconductor laser diode. The semiconductor laser diode may be an edge-emitting laser diode or a VCSEL, vertical cavity surface emitting laser. The gain element 110 may be made of a neodymium-doped yttrium orthovanadate or equivalently a Nd:YVO$_4$ crystal. The lasing wavelength may be approximately 1.06 microns or 1.34 microns. The latter is an eye-safe wavelength as previously described. Optical pump energy may alternatively be applied to the gain element 110 through the second surface 112. If operation at a different laser wavelength is desired, a different host crystal or dopant may be used.

In other embodiments, the gain element 110 may be a semiconductor element having a surface-emitting multilayer semiconductor gain-structure. Pump energy 150 may be directed to the gain structure as optical energy or electrical energy depending on the nature of the semiconductor structure. Reflection from the second end 92 is required for the laser system 102 to operate. Such a laser system 102 is commonly known as a VECSEL, vertical extended cavity surface emitting laser.

Figure 5:
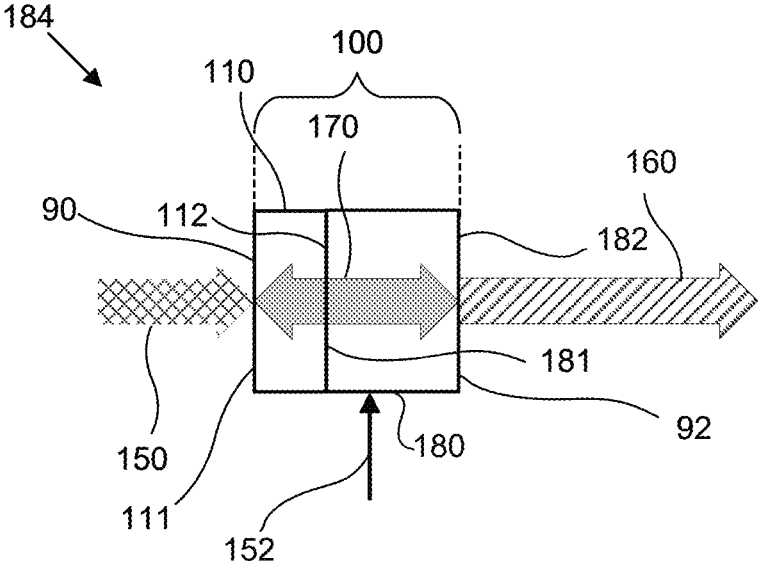
FIG. 5 is a schematic diagram of a frequency-modulated, continuous-wave microchip laser according to an embodiment of the current invention.

In another embodiment of a FMCW laser, the output coupling element 120 and the tuning element 140 may be combined into a tunable output coupling element 180. It thus may be said that the optical coupling element and the tuning element are a common element. A laser system 184 depicting this embodiment is shown in FIG. 5. The laser system 184 may be similar to the laser system 102 depicted in FIG. 4 and for brevity a description of some of the common elements will not be repeated here. In this embodiment, the resonant light 170 propagates through both the gain element 110 and the tunable output coupling element 180. The tunable output coupling element 180 has a first surface 181 and a second surface 182. Resonant light 170 passes through the first surface 181 and the second surface 182 is coated to be a partially transmitting surface that reflects some resonant light 170 back into the resonator 100 and allows some resonant light 170 to pass through forming output beam 160. The resonator 100 is formed between the first end 111 of the gain element 110 and the second end of the tunable output coupling element 180. A control signal 152 may be applied to the tunable output coupling element 180 to vary the optical path length through the tunable output coupling element 180. The tunable output coupling element 180 may be formed from an electrooptic or piezoelectric material that is transparent to the resonant light 170. Application of the control signal 152 may change the optical path length in the tunable output coupling element 180 by changing its refractive index, via the electrooptic effect, its length, by the piezoelectric effect, or a combination thereof. Examples of materials that may be used in the tunable output coupling element 180 include lithium niobate, lithium tantalate, and quartz. Other electrooptic or piezoelectric materials may be used. An advantage of using a tunable optical coupling element 180 is that no physical motion of the tunable optical coupling element is required to scan a frequency of the output beam 160, which may allow faster scans of the output beam frequency.

The second surface 112 of the gain element 110 may be contacting the first surface 181 of the tunable output coupling element 180 as shown in FIG. 5. They may be bonded together using an adhesive or may be optically contacted without use of an adhesive. Either or both surface 112 or 181 may be coated to reduce reflection of resonant light 170 at the surfaces. Alternatively, there may be a gap (not shown in FIG. 5) between these two elements.

The length of the resonator 100 of the microchip laser system 102 or 184 depicted in FIGS. 4 and 5, respectively, may be small, such as less than 5, 2, 1, or 0.5 mm or less. The resonator length may be in a range between any of these values, for example, between approximately 0.5 mm to 2 mm. Having a short resonator 100, with the gain element 110 situated at one end of the resonator 100 enhances single frequency operation of the laser system 102 or 184 as explained below.

Figure 6A:
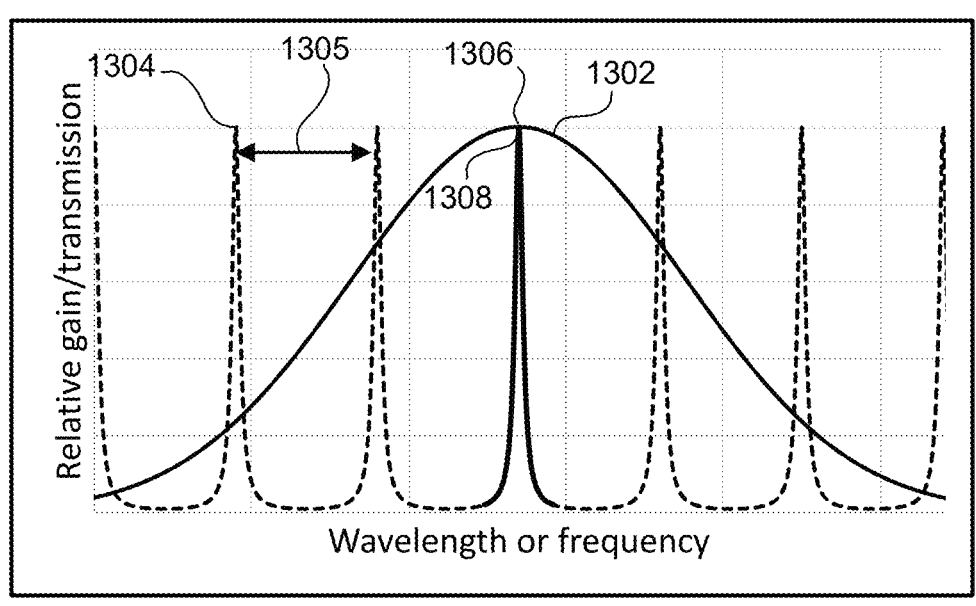
FIG. 6A is a diagram showing alignment of an axial mode spectrum and gain spectrum.

FIG. 6A schematically depicts a resonator axial mode spectrum 1304 and a gain curve 1302. The frequency difference between adjacent peaks in the axial mode spectrum 1305 is a free spectral range of the resonator. In this case a peak 1306 in the laser gain curve is in alignment with a peak 1308 in the resonator axial mode spectrum 1304. In general, a laser will lase at a wavelength corresponding to one or more of the axial mode peaks 1308. In various embodiments described below the relative position of the axial mode peaks 1308 may be shifted relative to the gain peak 1306 to obtain a desired axial mode alignment. In particular, the resonator axial mode spectrum 1304 may be shifted so that the peak 1308 is aligned or substantially aligned with the gain peak 1306 in the gain curve 1304. Operation in this manner facilitates single axial mode operation, which results in a single frequency output beam 160.

The position of the axial mode spectrum may be shifted by changing the optical path length between the first end 90 and second end 92 of the resonator 100. A change in resonator length of ¼ wavelength, which is 0.33 μm for a wavelength of 1.34 μm, is enough to move the laser from the condition of one, centered mode, to two modes straddling the gain curve, with equal gain. Such a change in resonator length may be readily achieved by applying a voltage to the tuning element 140 or tunable output coupling element 180 with the control signal 152.

The control signal 152 may cause the optical path length in the resonator 100 to vary by more than a quarter of the lasing wavelength, causing at least one axial mode peak 1308 to be aligned with the gain peak 1306 during the scan. A power of the output beam 160 and amplitude stability of the output beam 160 may be monitored by the monitor 12 (see FIG. 3) which may be a photodetector that samples a portion of the output beam 160 during the scan. A control signal 152 that results in high output power, good amplitude and frequency stability corresponds to alignment of an axial mode spectrum peak 1308 with the gain curve peak 1306. Once a scan has been completed, a steady control signal 152 that places the resonator 100 (see FIG. 4 or 5) in this aligned condition may be applied to the tuning element 140. This control signal level may be denoted as offset voltage. The output beam 160 frequency resulting from this alignment may be denoted as an aligned frequency. Scans in optical path length, and thus output frequency, may be made by adding a variable signal, such as a triangular waveform, to offset, as the control signal 152. The variable signal may be denoted as a modulation voltage. Application of the modulation voltage to the turning element 140 will cause the output frequency to oscillate back and forth about the aligned frequency. Thus the control signal 152 may consist to two signals, an offset voltage and a modulation voltage, applied simultaneously to the tuning element 140.

Figure 6B:
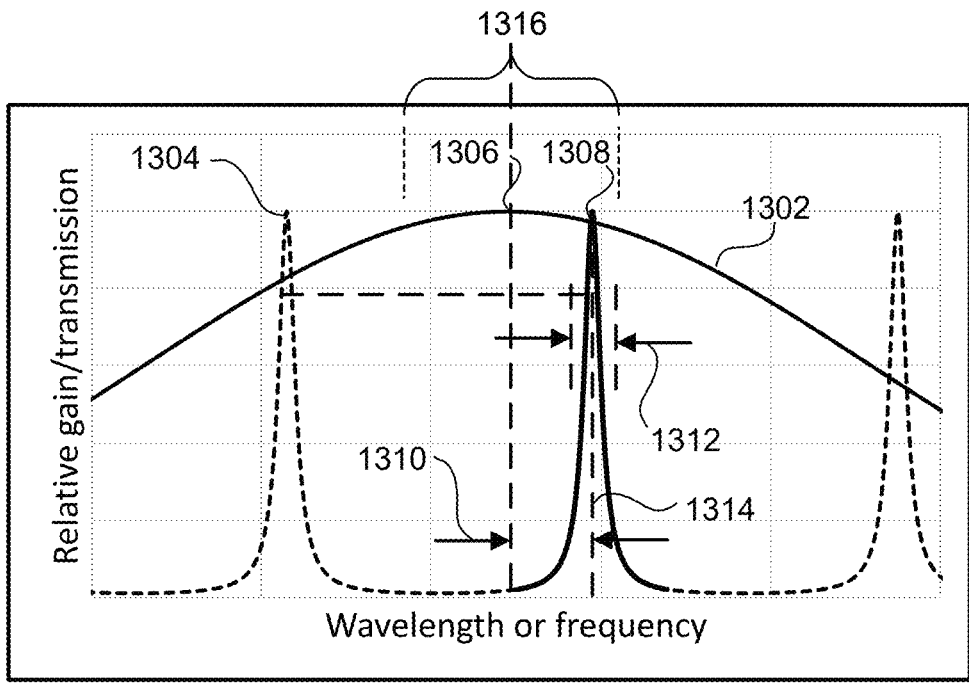
FIG. 6B is a diagram showing a deliberate frequency offset in the alignment of an axial mode spectrum and gain spectrum.

In some situations, the optical path length of the resonator 100 (see FIG. 4 or 5) may be deliberately detuned so that it does not correspond to the maximum gain 1306 of the gain curve 1302. FIG. 6B depicts an alignment of the axial mode spectrum 1304 with the gain curve 1302 with a deliberate frequency offset 1310. The frequency offset 1310 may be commanded by the processor 16 (see FIG. 3) to avoid interference from other ranging systems or for some other reason. The processor 16 may direct the laser to scan about a frequency range 1312 centered on a center frequency 1314. The center frequency may be aligned within one half of the free spectral range of the resonator 1305 to a gain peak 1306 of a gain element. This helps to ensure that the axial mode peak 1308 has a somewhat higher gain than any of the adjacent axial modes, which enables the laser to continue to lase on that single axial mode and have a single frequency output throughout a frequency scan. This ensures that the laser output is suitable for use in a coherent laser ranging system. In other words, this alignment helps to avoid a mode hop in the output beam 160, which would be undesirable in a ranging application. The laser ranging system may thus operate in a frequency window 1316 somewhat less than the axial mode spacing centered about the maximum gain 1306 of the gain curve 1302. For example, the frequency operating window may be at least 2%, 5%, or 10% of the axial mode spacing but no more than approximately 50%, 80%, or 90% of the axial mode spacing. If the center frequency 1314 is perfectly aligned with the gain peak 1306 the frequency scan range 1312 may theoretically be as large as the free spectral range of the resonator's axial mode spectrum.

Figure 6C:
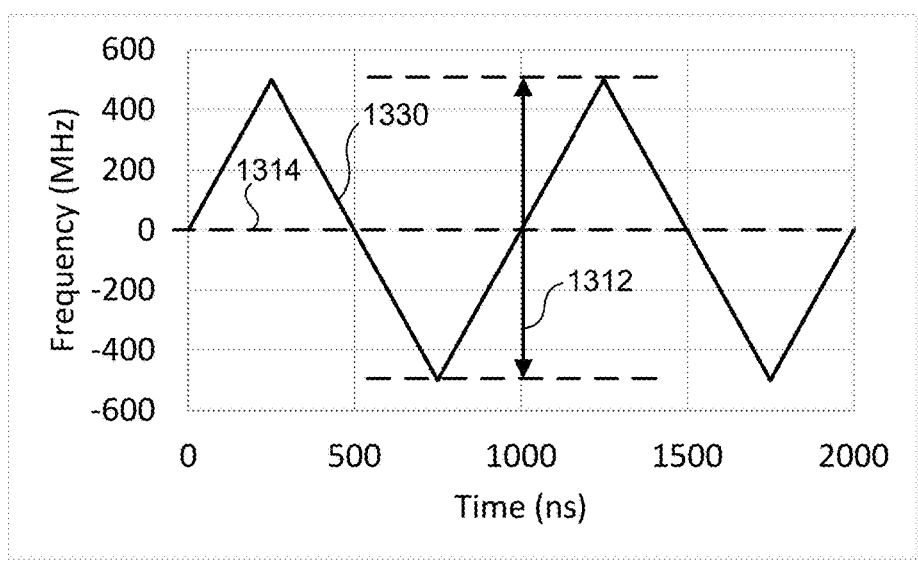
FIG. 6C shows an exemplary waveform of laser frequency versus time for a laser suitable for use in coherent LIDAR applications.

FIG. 6C shows an exemplary waveform 1330 of frequency versus time for a laser system 102 or 184 suitable for coherent ranging applications. In this example, the frequency of the scan, i.e. the scan rate, is 1 MHz and the depth of frequency modulation 1312 is 1 GHz. The frequency slew rate, the rate of change in frequency with respect to time, during a scan is 2 GHz/microsecond in this example. The waveform 1330 is centered about the center frequency 1314. A triangle wave variation of frequency with respect to time is shown in FIG. 6C. Both the frequency modulation depth 1312 and scan frequency may be varied by the processor as appropriate for the application. Also, other types of waveforms may be used. For example, the triangle waveform may be clipped at the inflection points so that it remains at a nominally constant value for a period of time greater than the total transient time to a target and back. This may help make the signal processing less calculation intensive. In other embodiments, the slope of the triangle wave may be different in the upward and downward directions. As long as the waveform is continuous and has portions with monotonic changes of frequency with time, it may be suitable for coherent ranging applications.

An ideal source for FMCW LIDAR would be strongly modulated in frequency but have no associated modulation in amplitude. Strong modulation in amplitude will make it more difficult to make an accurate measurement. In the extreme case, amplitude modulation will result in intervals of zero amplitude, i.e. the output beam power drops to zero, which is of course unacceptable. Thus, it is desirable to minimize the degree to which the intended frequency modulation creates undesirable modulation in amplitude. Arrangement to reduce undesirable amplitude are described below.

Most solid state lasers, defined as those lasers based on transparent crystals such as Nd:Vanadate, and excluding semiconductor lasers, have a relatively narrow band of frequency over which there is laser gain. This contrasts with semiconductor lasers which have broad gain. For instance, the gain of Nd:Vanadate is limited to a range of about 100 GHz, in contrast with a semiconductor laser which may have a gain frequency range ten times larger.

When the optical frequency of a solid-state laser is modulated by a GHz or more, the gain may change significantly, by several percent. The modulation in gain may create modulation in amplitude. Solid state lasers have a mechanism known as the relaxation oscillation phenomenon that enhances amplitude modulation. A small modulation in gain, on the order of a percent, can create modulation in amplitude of 100% if the frequency of the modulation is near the relaxation oscillation frequency.

As already noted, one way to reduce the effect of gain fluctuations is to adjust the laser so that the oscillating mode is centered on the gain peak. On the side of the gain curve, the gain is a strong function of optical frequency, while at the peak, to first order, there is zero change in gain with frequency. Thus, a powerful approach to minimizing amplitude fluctuations driven by frequency change is to observe the size and phase of the amplitude fluctuations relative to the known frequency change and then to adjust the laser resonator until the oscillating mode is at peak gain, and to first order, amplitude fluctuation is zero. The same piezoelectric transducer that is driving the frequency modulation at high frequency can be used near DC frequency to move the lasing mode to the center of the gain curve by applying an offset voltage. Alternatively, temperature control can be used to adjust the frequency of the lasing mode relative to the laser gain.

Figure 7A:
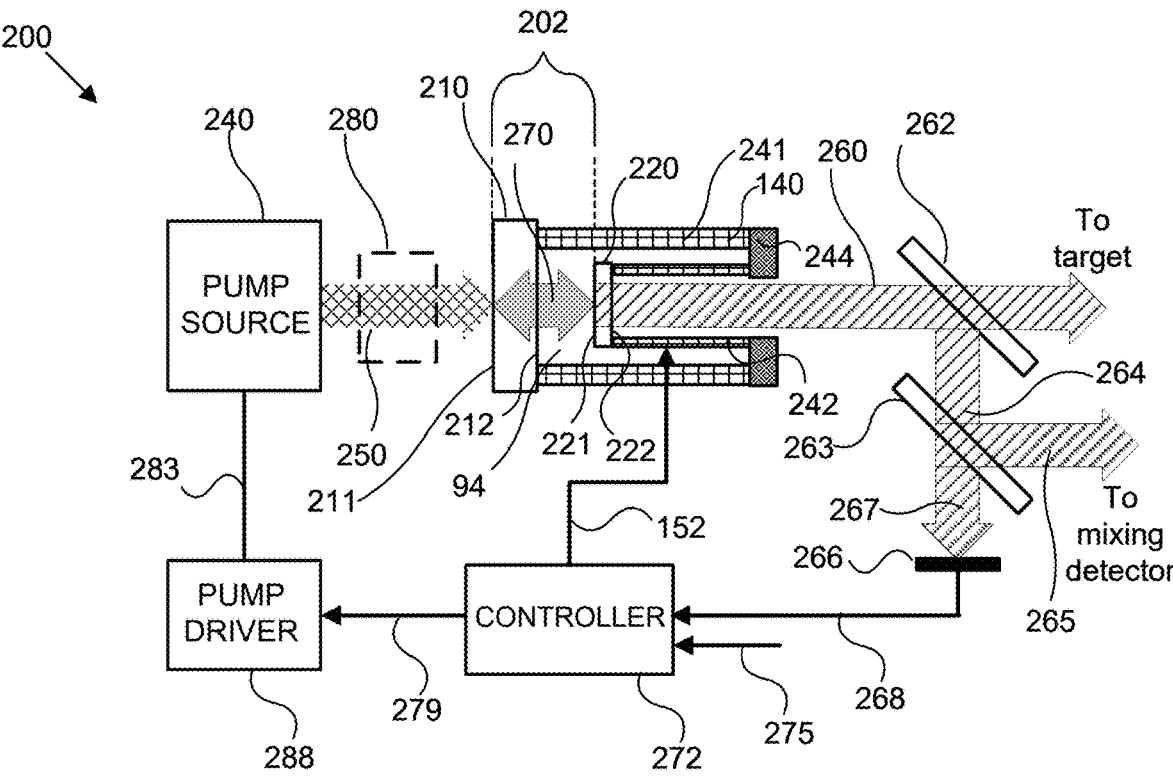
FIG. 7A is a schematic diagram of a frequency-modulated, continuous-wave microchip laser showing a feedback loop on output power according to an embodiment of the current invention.

FIG. 7A is a schematic diagram of a laser system 200, which is an embodiment of the laser system 102 shown in FIG. 4. The resonator 202 may be very short, such as less than approximately 0.5, 1, 2, or 5 mm in length in a range between any of these values. A gain element 210 may be a piece of Nd:YVO$_4$ crystal. Optical coatings may be applied to the first surface 211 and second surface 212 of the gain element 210. The first surface 211, which forms one end of the laser resonator 202, may be coated for high transmission at a pump wavelength and for high reflection at a lasing wavelength. The second surface 212, opposing the first surface 211, may be coated for high transmission at the laser wavelength.

The laser resonator 202 may be formed between the first surface 211 of the gain element 210 and a first surface 221 of an output coupling element 220. A gap 94 may be present between these two surfaces. The first surface 221 may be coated to reflect some resonant light 270 back into the resonator 202 and transmit some of the resonant light 270 in the laser resonator 202 as an output laser beam 260. That is the coating on the first surface 221 may serve as an output coupling surface that reflects most of the resonant light 270 at the lasing wavelength and couples out a portion to form the output beam 260. A second surface 222 of the output coupling element 220 may be coated for high transmission at the lasing wavelength.

The first surface 211 of the gain element 210 and the first surface 221 of the output coupling element 220 define the ends of the resonator 202. If first surface 211 and second surface 222 are planar surfaces, the resonator 202 is simple and may be less expensive to produce and build. An advantage of an all-planar resonator is that the requirement for positioning the pump beam within the resonator 202 is greatly relaxed. For an all-planar resonator, the pump can be positioned anywhere on the pumped face, while for a resonator with a curved reflecting surface it cannot. Stability of an all-planar resonator may be achieved by thermal lensing or deformation of the resonator ends introduced by pumping of the gain element 210. A typical tolerance on pump positioning for a resonator with curved optics is a few 10's of microns. In some embodiments either or both first surface 211 of the gain element 210 and the first surface 221 of the output coupling element 210 may be deliberately curved.

A tuning element 140 may be mechanically connected to the gain element 210 and the output coupling element 220. The tuning element 140 may consist of an outer member 241 and an inner member 242 mechanically attached to an end plate 244. A length of the inner member 242 may be varied by applying a control signal 152 to the inner member 242. The outer member 242 may have features that allow it to bend such that the alignment of the first surface 211 of the gain element 210 with the first surface 221 of the output coupling element 220 may be adjusted so as to change their alignment. The tuning element 140 need not enclose the beam path in the resonator 202 although this may be advantageous, since the tuning element 140 may then also serve to seal the laser resonator volume from outside contamination that may degrade laser performance. The resonator volume may be completely sealed, such that it is isolated from the surrounding atmosphere or it may have a seal that allows pressure equalization between the resonator volume and surrounding atmosphere. The outer member 241 may include an aperture or one or more edges positioned adjacent the resonant light 270 to assist in transverse mode control. The outer member 241 may not directly contact the gain element 210, but there may be one or more intermediate elements that rigidly connect the gain element 210 to the outer member 241.

The laser resonator 202 may be energized by a pump beam 250 emitted by a pump source 240. Optional optical element 280 may adjust a pump spot size of the pump beam 250 in the gain element 210. The optional optical element 280 may include an optical fiber, which allows the pump source 240 to be situated remotely from the laser resonator 202. The pump source 240 may be a single emitter, semiconductor laser diode.

Assuming the first surface 211 of the gain element 210 and the first surface 221 of the output coupling element 220 are properly aligned, the resonator 202 can lase with the application of sufficient power in the pump beam 250. Lasing is established by resonant light 270 circulating between the first surface 211 of the gain element 210 and the first surface 221 of the output coupling element 220. The gain element 210 and the output coupling element 220 must be aligned so that the resonant light 170 reflects off of the two end mirror coatings and returns to the same point. This will be possible if all surfaces are parallel, or by aligning one or both of the reflecting faces to achieve the desired condition of a ray reflecting back on itself indefinitely.

A portion of the output beam 260 may be picked off by a first beam splitter 262 forming a monitor beam 264. The portion of the output beam not picked off by the first beam splitter 262 may be directed to the target. The monitor beam 264 may be directed to a second beam splitter 263. The second beam splitter 263 may direct a portion of the monitor beam 264 to a mixing detector (not shown in FIG. 7A) and may pass a portion of the monitor beam 264 to form feedback beam 267. Feedback beam 267 is incident on a monitor detector 266. The monitor detector 266 generates an electrical signal 268 proportional to the power in the feedback beam 267 incident on the monitor detector 266. In other words, the monitor 266 intercepts a split-off portion of the output beam 266 to provide an electrical signal 268 proportional to an optical power of the output beam 260.

The electrical signal 268 may be an input to a controller 272. The controller 272 may receive one or more control signals 275 from the processer 16 shown in FIG. 3. The controller 272 may be integrated into the processor 16 or it may be an independent component. The controller 272 may output a control signal 152 that causes the inner member 242 to vary in length, thus controlling a length of the resonator 202. In other words, the controller 272 may be arranged to move the optical coupling element 220 relative to the gain element 210 by application of a modulation voltage and thereby scan a frequency of the output beam 260. The controller 272 may also be arranged to supply an offset voltage to the tuning element so as to center a frequency of the output beam to a value that avoids mode hops during the scan. The controller 272 may also vary a drive current 283 to the semiconductor laser in a feed forward manner to improve an amplitude stability of the output beam 260. To vary the drive current 283, the controller 272 may output a pump control signal 279 to pump laser driver 288. The pump control signal 279 may control the drive current 283 provided by the pump laser driver 288 to the pump source 240. Increasing a voltage of the control signal 279 may proportionally increase the drive current 283 provided to the pump source 240, increasing the power of the pump laser beam 250.

It should be appreciated that the arrangement and configuration of the various optical and electrical components may be rearranged or integrated together while maintaining the functionality of the laser system 200 depicted in FIG. 7A. For example, the beams reflected and passing through the first and second beam splitters 262 and 262 may be directed to different destinations. The controller 272 may be integrated with the pump laser driver 288. The second surface 222 of the output coupling element 220 may serve as the output coupling surface, rather than the first surface 221. In this case the first surface 221 may be anti-reflection coated at the laser wavelength. The tuning element 140 being may be situated in or adjacent to the gap 94 between the gain element 210 and the optical coupling element 220 instead of extending around the optical coupling element 220 as depicted in FIG. 7A.

As described earlier, the laser resonator 202 has an associated axial, or equivalently, a longitudinal mode spectrum. The spectrum is a series of peaks with intervening valleys as a function of wavelength or frequency. The peaks in the spectrum correspond to the condition that an optical wave making a round trip transit through the laser resonator will have the same phase as its initial phase. This condition is equivalent to a round trip optical path length through the laser resonator 202 being an integer number of wavelengths long. The gain element 210 will have a gain curve with a gain peak. The shape and location of the gain curve and gain peak is determined by the lasing dopant, the host material, and dopant/host material temperature.

An important goal of a range measurement system may be to have a high rate at which measurements can be made to obtain real time information regarding the surrounding environment. There is thus a need to make a large number of frequency scans or sweeps each second. If an image contains 100,000 pixels, and the image needs to be refreshed ten times per second, then 1 million measurements must be made in every second. The image may be referred to as a point cloud, which represents a map of the distance to targets in the field of view. For a FMCW measurement, this means that the scan of frequency must be repeated one million times per second. If the scanning is achieved by motion of a physical object, such as the optical coupling element 220, the optical coupling element must change its direction of motion very quickly. A large structure will have resonances at lower frequencies than a small structure of the same shape and material. Generally, the lowest-frequency resonances of a structure will be at frequencies such that a sound wave in the structural material will travel the length of the structure in one cycle of the frequency. The existence of resonances in a structure at frequencies near the frequency at which the structure is desired to move makes controlled motion of the structure much more difficult. Thus, if possible, it is desirable to keep the frequencies of structural resonances away from and preferable above the frequency of control. High frequency resonances may be obtained by making the structure stiff, small, and have a low mass. The speed of sound in typical structural materials is above 1000 meters per second. (This is well above the speed of sound in air.) For a 1000 meter per second sound speed, in one microsecond, the cycle time for a frequency of 1 MHz, sound will travel one millimeter in the structure. Thus, to avoid resonances at or below one MHz, a structure should be one millimeter or smaller in at least a dimension of motion. Solid objects having a volume of one cubic millimeter will typically have a mass of a few milligrams. If the optical coupling element 220 is mounted to a piezoelectric transducer, it is desirable that the optical coupling element make a small contribution to the total mass of the combined piezoelectric transducer/optical coupling element structure. For example, a mass of the optical coupling element may be below 1%, 2%, 5%, 10%, or 20% of the mass of the piezoelectric transducer or in a range between any of these values, for example, between 10% and 20% of the mass of the piezoelectric transducer.

At low modulation frequencies motion of the piezoelectric transducer is independent of frequency. A response of the piezoelectric transducer may be given in units of nanometers per volt. At a higher frequency, known as the resonant frequency, the piezoelectric transducer response becomes much larger. Above the resonance frequency is an anti-resonant frequency, at which the piezoelectric transducer has low or no response. When the response as a function of frequency varies by a large amount, as is the case in the frequency range containing the resonant and anti-resonant frequencies, it is difficult or impossible to create the sawtooth frequency pattern which is desired for FMCW LIDAR. Thus, it is desirable to have the resonance frequency higher, such as at least 20%, 30%, or 50% higher or in a range between 50% to 80% higher, than the modulation frequency. Operation at frequencies closer to the resonance frequency may be possible by applying a modulation voltage that is pre-distorted to produce a substantially linear scan in frequency despite the sawtooth frequency being near a resonance frequency.

If any given structure made of a given material has its resonance frequency measured, and then a scaled-down structure made to the same design and of the same material, will have a higher resonance frequency. The resonance frequency of the smaller structure will be increased by the inverse of the scaling factor. For example, if a structure is produced at one-half scale, then its resonance frequency will be doubled.

The resonance frequency of a piece of piezoelectric transducer which is blocky in shape (no thin walls) and which is attached on one face to a solid, immovable surface, and which has a size of approximately 1 mm, will be near 1 MHz. According to the scaling rule just described a piezoelectric transducer of the same shape with a dimension of 1 centimeter will have its resonance at 100 kHz.

It is preferable if the modulation frequency of the sawtooth is below that of the resonance frequency, for example, the sawtooth frequency being less than 50%, 70% or 80% or in a range of 50% to 80% of the resonance frequency. Thus, a 1-mm piezoelectric transducer element would be useful for creating a sawtooth wave up to approximately 800 kHz. For faster modulation, smaller piezoelectric transducer elements will be needed, and correspondingly less-massive optical coupling elements. For very high modulation frequencies, very small piezoelectric transducer and optical coupling elements will be required.

Returning to FIG. 7A, the inner member 242 may be a piezoelectric transducer. The piezoelectric transducer may be formed as a ring having an outer dimeter of approximately 5 mm, and an inner dimeter of approximately 3 mm. The thickness of the ring, defined as the distance measured along the common axes of the inner and outer diameters, may be less than 1 millimeter. The output coupling element 220 may be made of glass or fused silica, with a thickness between approximately 0.1 to 1 mm. The lateral dimensions need only be several times, for example four times, as large as a beam size, as defined by a $1/e^2$ beam radius, of the resonant light 270. The beam size of the resonant light is generally in a range of 10 to 100 microns. For a beam size of 50 microns assuming a lateral dimension four times the beam size, any size larger than approximately 0.2 mm×0.2 mm may be suitable. Thus, the surface area of both the first surface 221 and second surface 222 of the optical coupling element 220 may be as small as approximately 0.2 mm multiplied by 0.2 mm or 0.04 mm². A larger lateral dimension, such as less than approximately 1 mm, or approximately 0.5 mm or in a in a range between 0.2 mm to 0.5 mm may be appropriate if the beam size is larger or high frequency scan rates are not required.

The volume of the optical coupling element 220 may thus be in a range between approximately 0.004 mm³ (0.1×0.2× 0.2 mm) to approximately 1 mm³ (1 mm×1 mm×1 mm). If the optical coupling 220 is formed from fused silica having a density of approximately 2,200 kg/m³ a range in the mass of the optical coupling element may be between approximately to 0.009 to 2.2 milligrams. Thus, it may be said that the mass of the optical coupling element is a range between approximately 0.01 to 2 milligrams.

The use of very small, low-mass parts for the output coupling element 220 and the inner member 242 increases resonant frequencies of the tuning element 140, so that a relatively flat frequency response is possible to approximately 1 MHz and above. The materials of the outer member 241 and the endcap 244 may be chosen to enable single-optical-frequency operation of the laser system 200 over a wide range of temperature. This may be accomplished by choosing the structural materials so their net thermal expansion results in a shift in the axial mode spectrum that matches the gain peak wavelength shift with temperature of the laser material. Alternatively, single frequency operation over a broad temperature range may be obtained by application of an offset voltage to the tuning element.

In addition to a piezoelectric transducer, other types of actuators may be used as the tuning element 140. For example, the tuning element 140 may be a voice coil in which the inner member 242 may be a solenoid of the voice coil which moves in respond to current flowing through a wire coil on the outer member 241. Alternatively, the tuning element 140 may be a micro-electromechanical system (MEMS). Such a system may be fabricated photolithographically from silicon wafers, which may result in very low manufacturing costs. Silicon is transparent at a wavelength of 1.34 microns, so the output coupling element could be a mirror coated on a silicon MEMS device and the output beam could propagating through the silicon substrate supporting the mirror. An advantage of using a MEMS tuning element is that the optical coupling element and actuator that moves the optical coupling element can be very light and stiff, so that resonant frequencies of the structure are very high allowing a higher frequency scan rate, well above 1 MHz.

Single frequency operation of the laser system is enhanced by making the resonator length as small as possible, such as resonator optical path lengths less than 1 or 2 mm. A short resonator length increases the spacing between adjacent axial modes, which increases the differences in gain between adjacent modes. A previous exemplary resonator used a 1 mm thick Nd:YVO₄ crystal gain element and a 1 mm wide gap. This exemplary resonator had an optical path length of 3.15 mm. The axial mode spacing may be determined by dividing the speed of light by twice the resonator optical path length. The resultant spacing between axial mode peaks for this example is approximately 48 GHz. For this resonator optical path length, approximately 48 GHz would be the maximum frequency modulation depth of the output beam. Single axial mode operation over this entire range, may be enabled by orienting the gain peak so that it is substantially aligned with one of the axial mode peaks (see FIGS. 6A and 6B). Such an aligned condition allows tuning the output beam frequency over a broader frequency range without inducing a mode hop or multi-axial mode operation.

While using a short laser cavity is helpful in maintaining single axial mode operation, it may be detrimental to maintaining single transverse mode operation. A laser with a "single transverse mode" is a laser with a single, stable wavefront whose shape approximates a sphere or an ellipsoid. This stability leads to a high-quality beam. The beam from a single-transverse-mode laser has near-ideal beam properties. Such a beam has an M-squared ($M^2$) value in the range 1 to 2 in each of two orthogonal directions perpendicular to a propagation direction. It can be focused to a smaller spot than a beam from a multi-transverse-mode laser. Each transverse mode also has a different oscillating frequency, so in order to have a good quality frequency reference in a coherent LIDAR system, single transverse mode operation is important.

Single transverse mode operation of the resonator 202 may be improved by using a small diameter pump spot. Multi-transverse mode pump lasers may not be able maintain a small pump spot over the thickness of the gain element 210, since if pump beam 250 is focused tightly to create a small focal spot in the gain element 210, the pump beam 250 rapidly diverges rapidly expanding the pump spot size.

By contrast a single transverse mode pump source may be used to pump the resonator 202. With single transverse mode pumping, the pump beam 250 diameter in the gain element 210 may be less than 50, 25, or 10 microns over the entire length of the gain element 210. For clarity, the pump beam diameter herein will refer to a diameter of a circular area that encircles 90% of the beam power in the gain element 210. In other words, using a single-transverse-mode laser as the pump source 240 enables the transverse dimensions of a volume containing the laser gain of the pumped laser to be made smaller. That is a pumped diameter in the gain element 210 is smaller. As the pumped diameter gets smaller, the resonator 202 can be made shorter while maintaining single-transverse-mode operation of the resonant light 270. The resultant output beam 260 thus is single transverse mode. A single transverse mode pump source can be either butt coupled or tightly focused into the gain element 210 in the laser resonator 202 to obtain a small diameter pump spot. The pump spot diameter may be less than 10 or 20 microns, compared to the 50-to-100-micron pump spot diameters that are typical when using a multi-transverse mode pump source, such as a 100-micron aperture edge-emitting laser diode or a similarly sized VCSEL (vertical cavity surface emitting laser) pump source. The single transverse mode pump source may be either an edge-emitting laser diode with a small aperture or a small aperture VCSEL. Here the term single axial mode means that substantially all of the power, such as more than 80%, 90%, 95%, or 99% of the power, in a laser beam is in one axial mode. Here the term single transverse mode means that a beam can be characterized as having a $M^2$ value in each of two orthogonal directions perpendicular to a propagation direction of less than or equal to 1.5.

If a VCSEL is used as the gain element 210, single transverse mode operation may be enhanced by using a VCSEL with a small emitting aperture, which is directed into a similarly sized small pumped area of the gain element 210.

One way to make a laser operate in a single axial mode is to force all or most of the gain into a region within a few hundred microns of the end of the laser resonator 202. For the resonator depicted in FIG. 7A, this places the gain predominantly near the first surface 211 of the gain element 210. When this is done, adjacent modes are suppressed, since the standing wave pattern of each mode is heavily overlapped in the gain region. To achieve this condition of strong absorption of pump light for the gain element 210 formed from a Nd:YVO$_4$ crystal, the doping should be high, typically 2% or higher; the pump light should be linearly polarized parallel to the "c" axis of the Nd:YVO$_4$ and the pump wavelength should be at or near a peak of the Nd:YVO$_4$ absorption.

Absorption peaks in the Nd:YVO$_4$ crystal spectrum occur in several wavelength ranges. Two wavelength ranges that are attractive for pumping are a first range near 808 nm and a second range between 875 and 890 nm. The second wavelength range has relatively narrow absorption peaks at wavelengths of approximately 878.6, 879.5, 885, and 888 nm. An attractive feature of the 808 nm pump wavelength is that the absorption feature is approximately 5 nm wide, allowing efficient pumping with spectrally broader pump sources and looser control on the pumping wavelength. The second, longer wavelength range has the advantage of having a smaller quantum defect between the pump beam 250 and output beam 260. To lock and narrow the pump wavelength a grating stabilized pump laser may be used. The grating may be either internal to the pump laser or may be positioned external to the pump laser cavity and be part of the optics 280.

The smaller quantum defect of the second wavelength range has the advantage that the ratio of heat to useful power is smaller. This reduction in heat for a given level of laser output may allow higher output power, since Nd:YVO$_4$ lasers are commonly limited by heating. Heat-limited operation is indicated by "rollover" of the output power of the laser. "Rollover" is said to occur when the application of additional input pump power leads to diminished returns in laser output, or even negative returns, where output power reaches a maximum and increased pump power reduces output power. Pumping in the longer wavelength range should raise the power at which rollover occurs relative to pumping in the shorter wavelength range. Generally pumping in the longer wavelength range reduces thermal lensing and may allow a higher output power and more efficient laser system.

The second advantage of pumping in the longer wavelength range is that the semiconductor lasers available in this wavelength range may be both more powerful and have greater reliability. This is due to the fact that semiconductor lasers at these wavelengths can be produced with less, or no, aluminum content in the active lasing structure. The presence of aluminum in a semiconductor laser results in known degradation mechanisms that can limit their output power and lifetime.

As previously discussed, the gain element 210 may be a Nd:YVO$_4$ crystal that is optimized for single axial mode operation. The crystal thickness and doping level must be properly selected. A typical thickness may be less than or equal to approximately 1 or 2 millimeter or some smaller value such as approximately 0.5 mm, 0.4 mm, 0.3 mm, 0.2 mm, or 0.1 mm. There is a minimum thickness, such as approximately 0.1 mm, for the gain element 210 to have a sufficiently long path length for the pump beam 250 to provide for absorption of the pump beam. A doping level of the Nd ions in the crystal may be higher than is used for larger lasers, which are typically less than 1%; however, doping levels of approximately 1% may be appropriate in some cases. Doping levels of 2% or 3% may be appropriate for the gain element 210 in other cases. A unique "c" crystallographic axis of the YVO₄ crystal may be oriented so that it may be substantially in the plane of the first surface 211 and second surface 212, which may be substantially parallel with each other. The gain element 210 may be shaped as a rectangular parallelepiped.

Diffraction losses, due to clipping of the resonant light 270 in the resonator 202, place a lower limit on the lateral dimensions of the gain element 210. The lateral dimensions refer to the dimensions perpendicular to a lasing path of the resonant light 270, i.e., the width and height of the gain element 210. The smallest lateral dimension should be at least approximately three or four times as large as the beam size, as defined by a $1/e^2$ beam radius, of the resonant beam 270 to make diffraction losses negligible. A typical beam size in the resonator 202 may be in the range of 10 to 100 microns, so the minimum lateral dimension is in the range of 40 to 400 microns. As such, the lateral dimensions of the gain element first surface 211 and second surface 212 may be small, since the beam cross-sectional area is small. While a square face with lateral dimensions of 5 mm×5 mm is mechanically convenient, much smaller lateral dimensions are possible and may be advantageous to reduce cost and improve heat transfer from the gain element 210. For a beam size of 50 microns assuming a lateral dimension four times the beam size, any size larger than approximately 0.2 mm×0.2 mm may be suitable. Thus, the surface area of both the first surface 211 and second surface 212 of the gain element 210 may be as small as approximately 0.2 mm multiplied by 0.2 mm or 0.04 mm². A larger lateral dimension, such as approximately 0.5 mm or in a in a range between 0.2 mm to 0.5 mm may be appropriate if the beam size is larger or such a thin gain element 210 is mechanically fragile or too difficult to handle. Also, chipping along the edges of the gain element 210 may make a slightly larger lateral dimension more advantageous. The gain element 210 may thus have a similar or identical size to the optical coupling element 220 in some embodiments.

Figure 9:
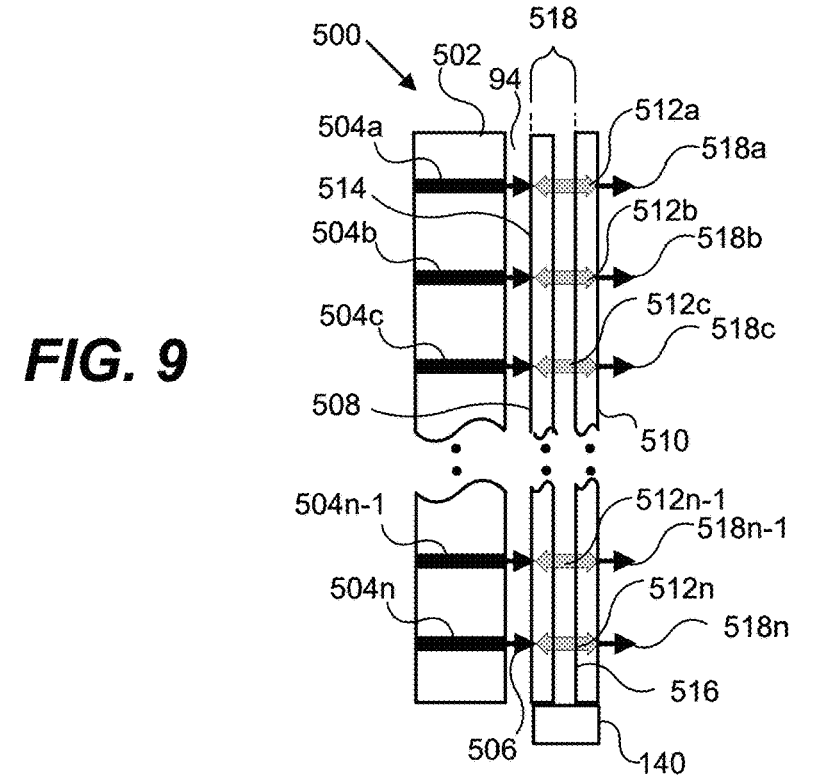
FIG. 9 is a schematic diagram of a frequency-modulated, continuous-wave microchip laser system having multiple laser resonators formed in part by a surface of a gain element according to an embodiment of the current invention.

The gain element cross-section need not be square, for example, a rectangular cross-section may be used. The smallest lateral dimension of the cross-section may be referred to as a selected lateral dimension. For a square cross-section gain element 210, either the width or height may be denoted as the selected lateral dimension. The cross-section shape may be chosen at least in part to help aid in removal of waste heat from the gain element 210. For example, the height or selected lateral dimension of the gain element 210 may be approximately 0.5 mm or in a range of 0.4 to 0.6 mm. and the width of the gain element may be approximately 2 mm. In other embodiments, the selected lateral dimension may be less than 1 mm or between 0.5 to 1.0 mm. For resonant beams 270 having a small size, such as 25 microns, the selected lateral dimension may be in the range of 0.1 to 0.5 mm. An aspect ratio between the height and width may be optimized for cost and heat transfer from the gain element 210. In some embodiments, particularly those using a plurality of laser emitters each of which may pump a laser resonator as depicted in FIG. 9, the gain element 210 may be required to have larger lateral dimensions.

A pump power of the pump source 240 will typically less than 8 watts for a semiconductor laser diode pump source having a single emitting aperture. The expected power in the output beam 260 at a wavelength of approximately 1.34 μm will be some percentage of the pump power; for example, 30%. The output beam 260 will be polarized, and will be nearly diffraction-limited, with a value of the beam quality figure of merit, M², of less than or equal to 1.5, where 1 is the ideal limit. A beam with a M² of less than or equal to 1.5 may be considered a single transverse mode beam. Such a low divergence beam may be desirable in laser ranging applications.

Unfortunately, in some cases the desired frequency scan rate of a laser system used in FMCW LIDAR and the relaxation oscillation frequency of that laser may be in the same vicinity, for example, within 50% of each other. This may result in undesired amplitude modulation on the output beam. A common way to counter relaxation oscillations caused by random noise is to use feedback. In such a feedback system, a power in the output beam 260 of the laser is detected by the monitor photodetector 266. The electrical signal 268 produced by the monitor 266 in response to the detected light may be directed to the controller 272, which may vary the pump control signal 279 supplied to the pump laser driver 288. The drive current 283 supplied to the pump source 240 may be appropriately scaled and shifted in phase relative to the electrical signal 268 in order to stabilize the laser amplitude.

When the cause of the amplitude fluctuation is a known signal instead of an unknown random noise, another approach to countering undesired amplitude modulation becomes available. This technique can be called feed-forward. Instead of observing the output of the laser and generating a signal which is fed-back, it is possible to generate a control signal that anticipates the laser's response to the applied frequency modulation signal. When a known signal is applied to create the frequency modulation, a related control signal can be applied to counter the anticipated amplitude modulation introduced by the frequency modulation. The amplitude modulation arises from the lasing axial mode experiencing different gain depending on the alignment of the gain curve 1302 with the axial mode spectrum 1304 (see FIG. 6A). Feed forward control signal anticipates the effect, rather than waiting for the effect to occur and then compensating.

The relationship between the signal applied to create frequency modulation and the anticipatory control signal applied to the laser drive current to counter undesired amplitude modulation may be complicated. To some degree, it can be calculated theoretically. But it may be most effective if the anticipatory signal is adjusted continuously or adjusted at regular intervals to best stabilize the laser's amplitude.

Figure 7B:
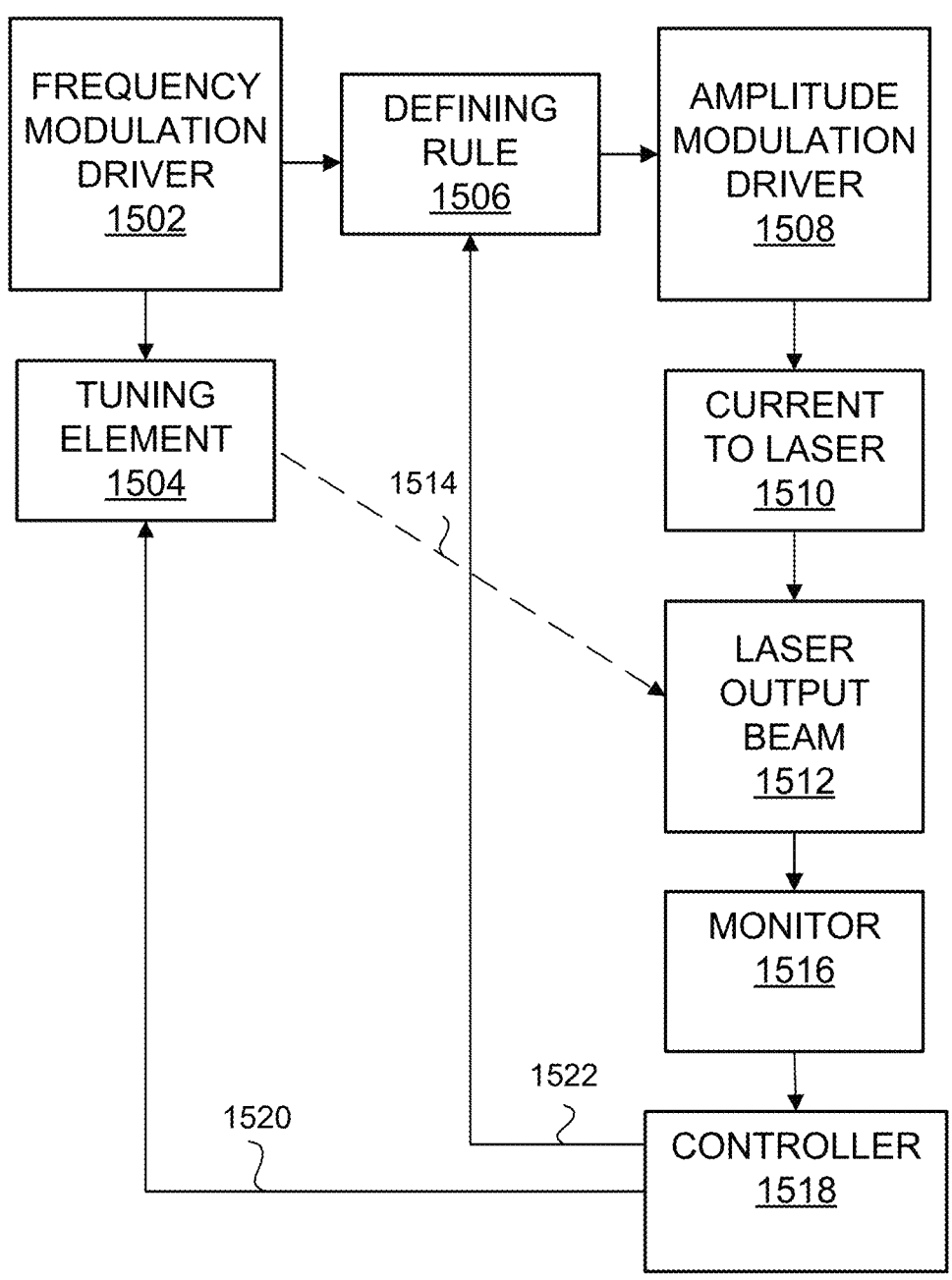
FIG. 7B is a schematic diagram of a representative hybrid control system 1500 that a uses both feed forward and feedback control.

FIG. 7B shows a representative schematic for a hybrid control system 1500 that a uses both feed forward and feedback control. The hybrid control system uses a fast anticipatory signal, but with the relationship of the anticipatory control signal to the frequency control signal changing slowly to optimize the system. This combination of a fast anticipatory (feed-forward) control with a slow adjustment of the control based on observed amplitude modulation, that is to say, slow adjustment of the system based on the observed result (feedback) may be a useful approach to stabilizing the amplitude of a laser which is being strongly modulated in frequency.

The hybrid control system 1500 has a frequency modulation driver 1502 that provides the modulation voltage to the tuning element 1504. There is defined rule 1506 that informs an amplitude modulation cancellation driver 1508 to provide a defined magnitude and phase of modulation to the drive current 1510 of the semiconductor laser that pumps the gain element. The pump current will generate an output laser beam 1512. As noted by the dashed line 1514, without adjustment modulation produced by the tuning element 1504 will induce an undesired amplitude modulation on the output laser beam 1512. This amplitude modulation may be detected by a monitor 1516 and its output directed to a controller or processor 1518. The controller 1518 may then supply an offset voltage 1520 to shift the average optical path length in the cavity to a desired alignment of the gain curve and axial mode peaks, for example, an axial mode peak centered with respect to the gain curve (see FIG. 6A). This aligned condition will result in the smallest variation in the drive current required to stabilize the amplitude of the output laser beam 1512. The controller 1518 may direct a feedback signal 1522 to alter the defining rule 1506 so that the feed forward control introduced by amplitude modulation cancellation driver 1508 is optimized. The feedback signal 1522 may be continuously applied or it may be updated at regular intervals. Changes in the feedback signal 1522 will be slow compared to changes in the offset voltage 1520.

For an FMCW LIDAR system, the rate of frequency modulation is equal to the rate at which distance measurements must be made and may be on the order of a few hundred kHz. The depth of modulation, which is the amount by which the optical frequency is changed, is driven by the desired distance resolution of the measurement. One point of confusion in discussions of FMCW LIDAR (and frequency-modulated systems in general) is that the rate of modulation and the depth of modulation are both frequencies, even though the two system parameters are quite different.

The depth of frequency modulation is driven by the simple rule that the distance resolution is roughly equal to the speed of light divided by the depth of modulation. For instance, if the depth of frequency modulation is 1 GHz ($10^9$ Hertz) then the speed of light divided by that value is the distance resolution, which is 0.3 meters, roughly one foot. ($3 \times 10^8$ meters per second divided by $10^9$ Hertz equals 0.3 meters.)

When very accurate distance measurement is needed, the depth if frequency modulation will need to be high. The associated amplitude modulation will be high unless measures are taken to reduce amplitude modulation, such as those previously described.

Figure 8:
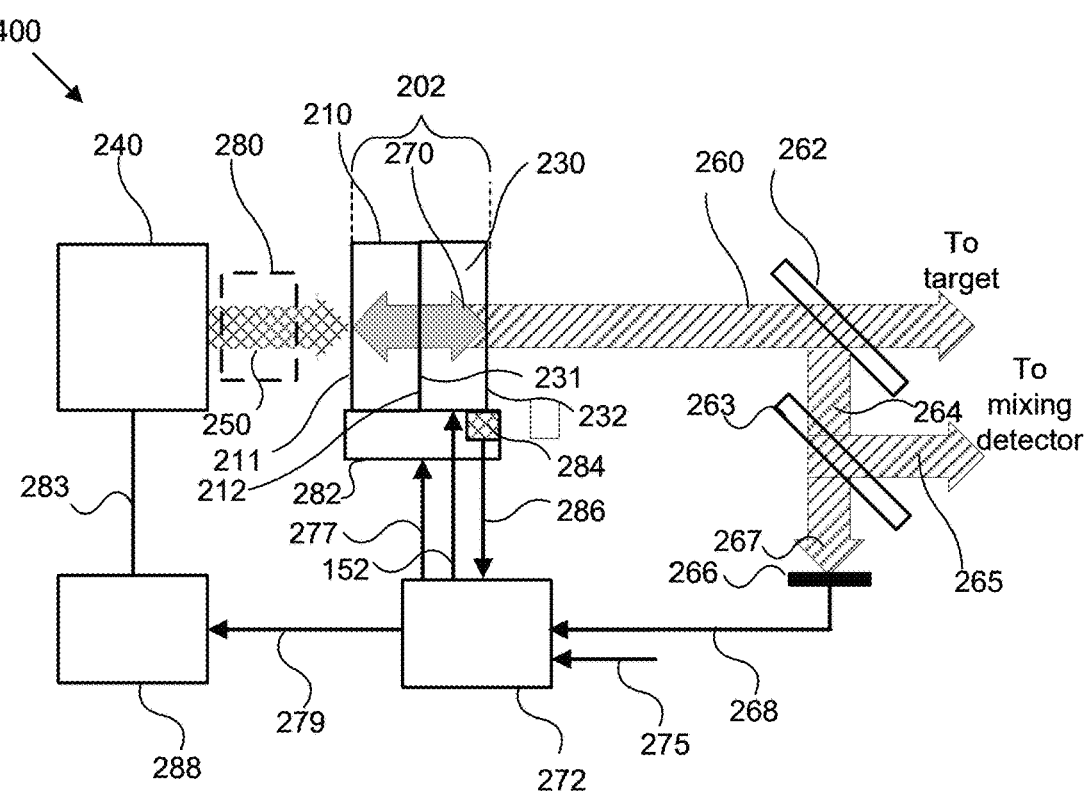
FIG. 8 is a schematic diagram of a frequency-modulated, continuous-wave microchip laser system showing the laser mounted on a temperature-controlled element according to an embodiment of the current invention.

FIG. 8 shows another embodiment of a FMCW laser system 400. The laser system 400 is similar to the laser system depicted in FIG. 7A and for brevity a description of some of the common elements will not be repeated here. In this embodiment, a gain element 210 and a tunable output coupling element 230 are situated very close to each other, for example, separated by less than 10 or 20 microns. Alternatively, they may be in contact with each other. The gain element 210 and the tunable output coupling element 230 may be bonded together directly, through a thin film coating, or by using an adhesive. The adhesive may be within a resonator region occupied by the resonant light 270 or it may be outside of this region. The first surface 211 of the gain element 210 and the second surface 232 of the tunable output coupling element 230 form the laser resonator 202. The surfaces 211 and 232 may be planar or curved. Surface curvature may be due to mounting stress, coating induced stress, deformation caused by pumping the resonator 202 or may be deliberately fabricated into the surface 211 or 232. Alignment of the laser resonator axial mode spectrum with the gain of the gain element 210 may be achieved by controlling the temperature of the laser resonator 202. For example, the laser resonator 202 may be thermally coupled to a heater 282. The heater 282 may generate heat by dissipating energy in an electrical resistor. A cavity control signal 277 may provide the necessary power to heat the electrical resistor. A temperature sensor 284 may be thermally coupled to the resonator 202 and may provide a feedback signal 286 to the controller 272. Alternatively, the resonator 202 may be thermally coupled to a thermoelectric cooler, which allows the resonator 202 to be either cooled or heated.

The controller 272 additionally may provide a control signal 152 to the tunable optical coupling element 230. The control signal 152 may cause the tunable output coupler 230 to change its optical path length, causing an output frequency of the output beam 260 to scan upward and downward. The cavity control signal 277 may be arranged to place the resonator 202 in a condition where an axial mode peak is substantially aligned with the gain peak as depicted in FIG. 6A. The control signal 152 may therefore be a pure alternating signal with no voltage offset.

A potential problem when scanning the output frequency of any laser system is that relaxation oscillations may be excited in the laser. Relaxation oscillations will cause fluctuation of the output power and the resultant power instability may cause the laser to be unusable for coherent LIDAR applications. One solution to avoid relaxation oscillations is to limit the scan frequency to some fraction of the relaxation oscillation frequency. For the previously described exemplary laser with a 1 mm thick vanadate gain element and a 1 gap, we have measured the relaxation oscillation frequency to be approximately 2 MHz. Frequency scan rates below 10%, 20%, or 50% of this frequency will generally avoid excitation of relaxation oscillations that will cause excessive amplitude instability.

As previously described, there are other approaches to reduce amplitude instability. As noted earlier, one approach is to use the electrical signal 268 from the monitor detector 266 as part of a feedback loop on the power of the output beam 260. If the output power drops, the controller 272 can increase the drive current 283 to the pump source 250. If the output power rises, the controller 272 can decrease the drive current 283 to the pump source 250. Such a system may be referred to as a "noise eater". The bandwidth of the feedback loop should be equal to or greater than the relaxation oscillations to effectively damp these oscillations.

Another approach to reducing amplitude instability is feed forward control or compensation. Here a predetermined modulation signal may be added to a DC signal to generate a drive current 283 that energizes the pump source 240. The modulation signal has a known amplitude and phase relationship to the amplitude and phase of the control signal 152 that varies the optical path length of the resonator 202. This relationship is predetermined by measurement or analysis of the frequency response of the laser system and once determined may be set permanently or only occasionally recalibrated. Specifically, the feed forward control may be tuned to substantially cancel amplitude oscillations at the frequency of the control signal 152 that varies the optical path length of the resonator 202. For a semiconductor laser diode pump source, the drive current modulates a power of the pump beam 250 produced by the pump source 240.

Yet, another approach to damping relaxation oscillations is to place a nonlinear optical element in the resonator arranged to convert the lasing wavelength to another optical wavelength. The nonlinear conversion process increases losses when the power of the circulating resonant light increases, which dampens the relaxation oscillations. In some embodiments, the output coupling element or the tunable output coupling element may be the nonlinear optical element so that no additional element is required in the resonator. In other embodiments, a separate nonlinear optical element may be used. The light generated through the nonlinear optical process may be used in a ranging application or it may be discarded. For example, a laser operating at 1.06 microns may have its circulating resonant light converted to a second harmonic wavelength of 532 nm, which is used in the ranging application.

An advantage of the laser system 200 depicted in FIG. 7A is the higher output power achievable on the output beam 260 compared to direct frequency-tunable semiconductor sources. In some embodiments, the output power may be in an eye-safe range, for example, if the lasing wavelength is approximately 1.3 microns, the optical power may be in a range between approximately 10 and 40 mW. Much higher optical powers are achievable. Assuming an 8 W pump source and 30% conversion efficiency yields an output power of 2.4 Watts, so the output power may be in a range between approximately 0.5 to 3 Watts. Even higher output powers are achievable as described below.

Increased Laser System Output Power

The previously described laser systems may be limited in their output power by thermal effects in the resonator or by limits on the available pump power. For example, available output powers using a single emitter pump may be limited to approximately 3 W. High output laser systems, may be required for very long-distance ranging, such as distances greater than approximately 10 km. It should be appreciated that the approaches to higher output power described below are not limited to long-range LIDAR applications but may be useful in short- and mid-range LIDAR systems.

There are three basic approaches to increasing the output power of a laser system. In a first approach, multiple laser resonators may operate simultaneously increasing the output power by the number of laser resonators in the laser system. In a second approach, the output of a single laser resonator is amplified by passing the output beam through a second gain element outside of the resonator. The second gain element serves as an amplifier increasing the laser system output. In a third approach, the pump power to a single resonator is increased, by spatially combining the output of multiple emitters into a single pump spot in a gain element. Each of these approaches is described below.

The first approach uses a monolithic pump source that has a plurality of laser emitters each of which may pump a laser resonator. Such an architecture is shown in FIG. 9, which shows a laser system 500 having a monolithic pump source 502 having a plurality of individual pump lasers 504a, 504b, 504c, . . . , 504n-1, 504n. The number of individual pump lasers, n, on the monolithic die 502 is equal or greater than two. In some cases, the number of pump lasers may be very large, exceeding 10 or even 100. The monolithic, multiple emitter pump source 502 may be a laser diode bar composed of a plurality of multiple transverse mode or single transverse mode emitters fabricated on a single, monolithic semiconductor die. Alternatively, the multiple emitter pump source 502 may be a 1- or 2-dimensional array of VCSELs fabricated on a single, monolithic semiconductor die.

All the emitting apertures of the monolith pump source 502 may have substantially the same emitting area or the emitting apertures may have different sizes. The monolith pump source 502 may have a single electrical connection. In this case, current supplied by the single electrical connection supplies power to all the individual pump lasers 504a thru 504n and the current through each laser cannot be controlled independent of the current through the other laser. In other embodiments, some or all of the individual pump lasers 504a thru 504n may have an independent electrical connection. In this case, the current through a laser may be controlled independently of the current through other laser sources in the monolith pump source 502.

A pump beam 506 may be emitted by each individual pump lasers 504a thru 504n. The pump beam 506 may be coupled into a gain element 508. The gain element 508 may be fabricated from a doped crystal, such as $Nd:YVO_4$. An optical coupling element 510 may be situated adjacent the gain element 508. The optical coupling element 510 may be fabricated from glass, fused silica, or any material transparent at the lasing wavelength. A first side 514 of the gain element 508 and a first side 516 of the optical coupling element 510 may be coated and aligned as previously described to form a plurality of resonators 512a, 512b, 512c, . . . , 512n-1, 512n. The cavity length 518 of each of the resonators may be substantially similar. Advantageously the plurality of laser resonators 512a thru 512n may be formed by a single gain element 508 and single optical coupling element 510. That is many laser resonators 512a thru 512n may operate simultaneously using only two elements in the laser resonator, the gain element 508 and the optical coupling 510. Each gain element 508 and optical coupling element 510 will have multiple, spatially separated, lasing paths. For example, laser diode bars producing 40 W of cw power or more are commercially available. These bars may have nineteen 150-micron wide emitting apertures arranged on a 500-micron pitch. In this example, the total output power of the laser system 500 may be 19 times that of an individual laser emitter, such as that depicted in FIG. 7A. Each laser resonator 512a thru 512n may produce an output beam 518a, 518b, 518c, . . . 518n-1, 518n. The laser resonators 512a thru 512n may be coupled, so that the output beams 518a thru 518n are synchronized in phase, or the output beams 518a thru 518n may be independent. In practice, such a laser system 500 may operate without all laser resonator 512a, 512b, 512c, . . . , 512n-1, 512n functioning, since the loss of a single resonator may have only a small impact on the total output power.

The laser system 500 described above allows multiple passively frequency modulated lasers to use only a single, monolithic block of gain material as the gain element 508 and a single, monolithic block as the optical coupling element 510. This architecture is particularly attractive for frequency modulated laser cavities using planar mirrors on both ends of the laser cavity. In this case, all the frequency modulated laser cavities may be aligned simultaneously.

Figure 10:
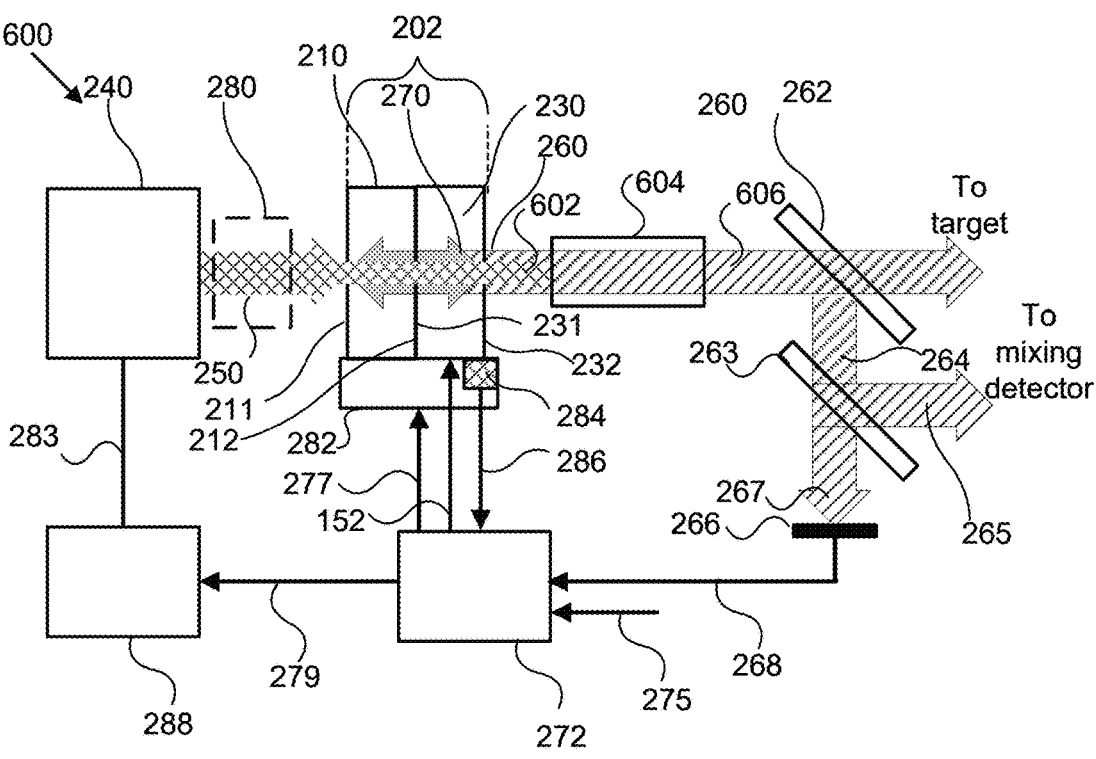
FIG. 10 is a schematic diagram of a frequency-modulated, continuous-wave microchip laser system with an amplified output according to an embodiment of the current invention.

The second approach to increase the output power of a laser system is to provide an amplifier to boost the laser system output power. The laser system thus has two gain elements, a first gain element within the resonator and a second gain element in the amplifier outside of the resonator. A particularly advantageous architecture is to use a single pump source to energize both the laser and the amplifier. FIG. 10 shows a schematic diagram of a laser system 600 that amplifies the output of the laser resonator 202. The laser system 600 shown in FIG. 10 uses the laser system 200 depicted in FIG. 8, with the addition of an amplifier 604; however, any of the other previously described laser systems 100, 300, 400, or 500 may be used in place of laser system 400. It may be desirable if the resonator 202 is short, for example, <2 mm to maintain a higher pump intensity in the amplifier 604 without a requirement to refocus the pump beam, although refocusing between the resonator 202 and amplifier 604 may be used in some cases.

The laser system 600 may be arranged so that the gain element 210 absorbs only a portion of the pump beam 250. Thus, a significant percentage of the pump beam 250 passes through the gain element 210. For example, more than 50%, 75%, 90%, 95%, or 99% of the pump beam 250 may pass through the gain element 210. While there may be some absorption of the remaining pump beam in the optical coupling element 220 most of the pump beam 250 may pass through the resonator 220 forming a remaining pump beam 602. The remaining pump beam 602 may pump the amplifier 604 causing the amplifier 604 to have gain for the resonator 202 output beam 260. The output beam 260 is thus amplified as it passes through the amplifier 604 producing an amplified beam, which has a higher optical power that can be directed to the target.

In other embodiments, the pump beam 604 that energizes the amplifier 604 does not pass through the resonator 202. This arrangement avoids the pump beam 604 passing through the optical coupling element 220. The arrangement may also facilitate mode matching of the pumped volume in the amplifier with the mode size of the output beam.

The amplifier 604 may be fabricated from the same material as the gain element 210, which ensures that both elements have gain at a similar wavelength. In some embodiments, a doping level in the amplifier 604 may be higher than that of the gain element 210. Having different doping levels may be desirable since there is no longer a need to absorb a significant fraction of the pump beam 250 in the gain element 210 to have an efficient laser system. The doping level in the gain element 210 may thus be low.

An advantage of the laser system 600 is that making the gain element 210 thin may result in poor efficiency, since much of the pump beam 250 may not be absorbed. The laser system 600 enables the pump beam 250 not absorbed in the gain element 210 to be utilized and not wasted. The laser system 600 spreads out where waste heat is generated. Waste heat due to the quantum defect and incomplete gain extraction is produced in both the gain element 210 and amplifier 604, compared to having all waste heat produced in the gain element 210. This reduces the thermal load on the gain element 210, which may allow a larger operating window for single axial mode and single transverse mode operation of the resonator 202.

While using a single pump source to pump amplifier 604 through the gain element 210 is advantageous in many applications, this is not a requirement. In alternative embodiments, the pumping beam 250 may be split between the gain element 210 and the amplifier 604 and individually directed into each element. For higher power operation, different pump sources may be used for the gain element 210 and amplifier 604. The output beam 260 may be focused inside the amplifier 604 and the amplifier pump beam 602 may be substantially spatially overlapped.

Figure 11:
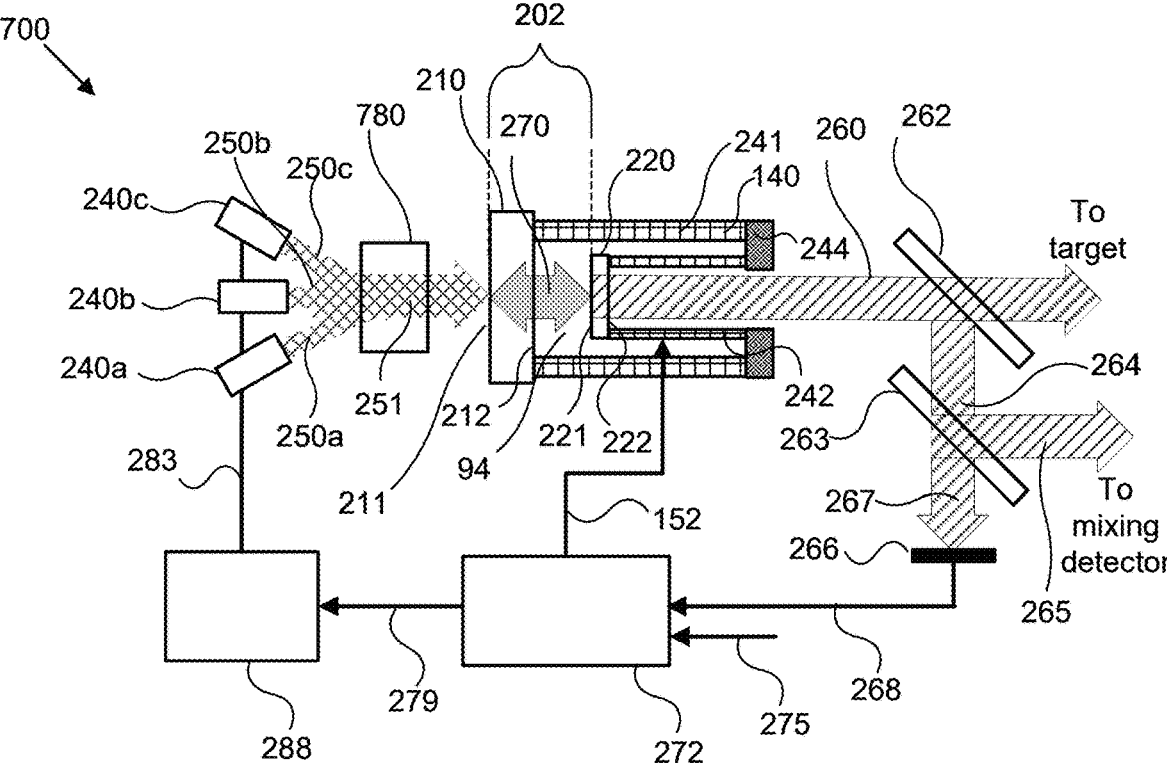
FIG. 11 is a schematic diagram of a frequency-modulated, continuous-wave microchip laser system having spatially combined pump beams according to an embodiment of the current invention.

The third approach to increase the output power of a laser system is to spatially combine the output of multiple emitters into a common pump spot in a gain element. FIG. 11 shows a schematic diagram of a laser system 700 having multiple emitters combined into a common pump spot. The laser system 700 may be similar to the laser system depicted in FIG. 7A and for brevity a description of some of the common elements will not be repeated here. Instead of a single pump laser 240 as depicted in FIG. 7A laser system 700 has multiple pump lasers 240a, 240b, and 240c. While three pump lasers are shown in FIG. 11 this number is exemplary only and any number of pump lasers, such as but not limited to, 2, 3, 4, 5 or more, may be used. The individual pump beams 250a, 250b and 250c of the pump lasers 240a,

240b, and 240c, respectively, are spatially combined to form a combined pump beam 251. The combined pump beam 251 has power from two or more emitters overlapping in a common pump spot in the gain element 210 of the resonator 202. The spatial combining may occur in the optical element 780 (as depicted in FIG. 11) or it may occur in the gain element 210. For a pump source with an external grating, the external grating may be incorporated into the optical element 780. Spatial combining in the gain element 210 may be realized by orienting the individual pump beams 250a, 250b and 250c at a slight angle to each other and overlapping them in the gain element 210. In this arrangement, spatial overlapping of the individual pump beams 250a, 250b and 250c occurs primarily in the gain element or adjacent to the gain element and there is little, if any, spatial overlapping of the individual pump beams 250a, 250b and 250c in the optical element 780. Thus, the individual pump beams 250a, 250b and 250c are spatially distinct in the optical element 780 and only spatially combine in or adjacent to the gain element 210. In other words, the combined pump beam 251 occurs only in or adjacent to the gain element 210. If the spatial combining is done in the optical element 780, the individual pump beams spatially overlap in the optical element 780 and the combined pump beam 251 is directed to the gain element 210. In such an arrangement, the optical element 780 may include an optical fiber that allows the pump lasers 240a, 240b, and 240c, to be situated remotely from the resonator 202. The pump lasers 240a, 240b, and 240c, and optical element 780 may be situated in a common package whose output is fiber delivered to the gain element 210.

The multiple emitters may be situated on a common monolithic semiconductor die such as the monolithic die 502 depicted in FIG. 9. Unlike the arrangement depicted in FIG. 9, the emitters in FIG. 11 are spatially combined to form a common pump spot in the gain element 210. Also, unlike FIG. 9 the multiple emitters may be formed from a plurality of discrete semiconductor die that may be individually mounted. The individual emitters in either case may be emitters that emit in a single transverse mode or emitters that emit in multiple transverse modes (often known as wide stripe emitters). If all the emitters are formed on a monolithic die, they will all operate at the same nominal emitting wavelength. If the emitters are discrete, they may emit at different wavelengths, which may facilitate spatially combining the beams using a dichroic mirror which is part of optical element 780. The wavelengths of the different emitters may be chosen to match different absorption peaks in the gain element 210.

If the combined pump beam 251 is delivered to the gain element 210 using an optical fiber, it will generally be unpolarized when it is coupled into the gain element 210, since propagation through a fiber tends to scramble polarization. If the optical element 780 that helps deliver the combined pump beam 251 to the gain element 210 uses only free space optics, such as lenses and mirrors, without use of a fiber, the polarization of the combined pump beam 251 may be preserved through the optical element 780. The combined pump beam 251 incident on the gain element 210 may thus be polarized with a fixed polarization orientation. In other words, each of the pump beams 250a, 250b and 250c, that form the combined pump beam 251, is incident in a polarized form on a common pump spot on the gain element 210. As used herein, the pump being polarized means that at least 80% of the power in the beam is in a fixed linear polarization. This could be experimentally verified by demonstrating that 80% of the power of the beam can be transmitted through a linear polarizer.

Edge-emitting laser diodes generally have a polarized output. The polarization may be either in the plane of the epitaxial layers of the laser diode or perpendicular to the plane of the epitaxial layers, depending on the details of the epitaxial layers, the laser diode waveguide characteristics, and the mounting of the laser diode die to its heat sink. Preserving the polarized output of an edge-emitting laser diode used as a pump source so that the pump beam incident on the gain element is polarized may be advantageous in as previously described.

A pump beam produced by an edge-emitting laser diode is generally not circularly symmetric. In the fast axis, perpendicular to the plane of the epitaxial layers forming the laser diode, the beam has an $M^2$ close to 1 and diverges very rapidly, since the emission size is very small along this axis, such as approximately 1 micron. In the plane of the epitaxial layers, the divergence is generally lower. Depending on the width of the lasing stripe the $M^2$ value of the pump beam may be near 1 up to 10 or more. Wider stripes, such as 100 to 200 micron stripe widths, generally have larger $M^2$ values indicating poorer beam quality along this axis. When spatially combining pump beams from multiple emitters it may be advantageous to bring the beams together along the fast axis, since this may result in a more symmetric common pump spot.

Advantageously using a polarized pump allows the polarization of the pump beam 250 or combined pump beam 251 to be aligned with a desired crystallographic axis of the gain element. The crystallographic axis may be chosen based on having desirable absorption properties for the pump beam 250 or combined pump beam 251. For example, the c-crystallographic of the $Nd:YVO_4$ has a higher absorption cross-section than other crystallographic axis of $Nd:YVO_4$ so the pump beam 250 or combined pump beam 251 may be polarized so that the is substantially aligned with the c-crystallographic.

The laser systems shown in FIGS. 9-11 may all enable higher output power and higher pulse energy operation than the laser systems shown in FIGS. 4, 5, 6, 7 and 8. These systems may be particularly attractive for ranging systems requiring measurement of distances to remote targets, such as target distances greater than 1, 5, 10, 50, or 100 km. In an alternative method of operation, not all pump lasers 240a, 240b, and 240c need be operated simultaneously. For example, one or more pump laser may remain off and be held in reserve. In this case, if another pump laser malfunctions the one or more reserve lasers can be activated, and the malfunctioning pump laser deactivated. Such an arrangement may increase the reliability of the laser system 700. Alternatively, all pump lasers 240a, 240b, and 240c may operate simultaneously and if one pump laser fails, the pump power produced by the still functioning pump lasers may be increased to compensate for the power lost from the failed pump laser.

In other embodiments, an additional element may be added to any of the previously described resonators to provide additional frequency control. These elements may introduce a frequency dependent loss that helps to control the laser's output frequency and axial mode structure. The additional frequency control elements may include an etalon, a birefringent filter, and a grating. Some of the previously described elements, such as the gain element, the output coupling element, and the tunable output coupling element may incorporate one or more of these additional frequency control elements.

Ranging System Integration

Any of the previously described laser systems may be integrated into the ranging system 10 shown in FIG. 3. FIG. 12 shows a flow chart 1400 that depicts a method of determining a distance to, and a velocity of, a target using one of these laser systems according to an embodiment of the current invention. The flow chart 1400 starts at step 1402. At step 1404 a FMCW laser is operated to generate an output beam that is scanned upward or downward in frequency. Here scanning the frequency means that the frequency varies upward or downward in a continuous and monotonic manner. The frequency of the output beam may be scanned upward or downward in a linear manner forming an upwardly rising or downwardly falling portion of a triangular waveform. Other types of waveforms may be used as desired. At step 1406 a portion of the output beam may be diverted to form a reference signal that is directed to a mixing detector. At step 1408 a return signal, which is light reflected off of a target, is directed to the mixing detector. At step 1410, the return signal is heterodyned with the reference signal in the mixing detector. A resultant first beat signal, which is the frequency difference between the reference signal and returned signal, is generated. At step 1412, the first beat signal is stored. At step 1424 the output frequency may be scanned in an opposite direction from the previous scan, that is downward if the previous scan was upward or upward if the previous scan was downward. Again, the frequency changes in a continuous and monotonic manner during the scan. The output frequency may be scanned downward or upward in a linear manner forming a downwardly falling or upwardly rising portion of a triangular waveform. The shape of the waveform during the upward and downward moving scans may be similar or it may be different. At step 1426, a portion of the output beam may be diverted to form a reference signal that is directed to a mixing detector. At step 1428 a return signal is received from the target and directed to the mixing detector. At step 1430, the return signal is heterodyned with the reference signal in the mixing detector. A resultant second beat signal, which is the frequency difference between the reference signal and returned signal, is generate. At step 1432, the average of the first and second beat signals may be used to determine a distance to the target. A known speed of a platform 1434 to which the laser ranging system is mounted may be an input to the distance determination performed at step 1432. Also, in step 1432 the difference between the first and second beat signals may be used to determine target motion toward or away from the platform. If the first and second beat signals are the same, the target is stationary or moving at the same speed as the platform.

If the application is such that it is known that the platform and target are stationary, a measurement of the distance may be made using a single frequency sweep direction. That is a determination of the target distance may be made after step 1412 using the first beat note and the method may return to the start at step 1402 for another distance measurement.

A scan frequency, scan waveform, scan range, and center frequency may all be controlled by the processor 16 depicted in FIG. 3, the controller 272 depicted in FIG. 7A, 8, 10 or 11 or the controller depicted in FIG. 7B. These output beam parameters may be adjusted by controlling the optical path length within the resonator. The optical path length is controlled by use of a control signal to the tuning element as previously described. The optical path length in the resonator may be controlled to ensure that the laser operates in a single axial mode throughout a frequency scan. The processor 16 may run intermittent checks to ensure that the center frequency corresponds to an axial mode being substantially aligned with the peak of the gain curve so as to avoid multi-axial mode operation. An output power of the output beam may be controlled by controlling the pump power directed to the resonator.

There is fundamental trade off in the ability to accurately measure a frequency. An accuracy of a frequency measurement is inversely proportional to the time required to make the measurement. An accurate measurement of a frequency takes a relatively long time, whereas a courser measurement of a frequency may be done in a shorter time period. For example, in a period of one microsecond, it is possible to measure a frequency with a resolution of 1 MHz, but it is difficult to resolve below 1 MHz. For an FMCW laser ranging system, this limitation determines a requirement for a range of optical frequency change which must occur in a frequency scan. If the distance to the target is to be resolved with resolution of 0.1% of the maximum range, which is typical for a laser ranging system, then for an FMCW system, frequency must be resolved with resolution of 0.1% of the maximum frequency excursion, or 1 part in 1000. With a frequency resolution of 1 MHz, this means that the total range of frequency sweep must be at least 1000 MHz, or equivalently 1 GHz. Thus, an exemplary FMCW system requires a laser which can have a frequency output that is swept or equivalently scanned, with the total frequency change in the sweep, i.e. the frequency modulation depth, of at least 1 GHz. The optical frequency of a laser operating at a wavelength of 1.34 μm, is 224,0000 GHz. So, a change in optical frequency of 1 GHz is a change of 1 part in 224,000. This can be accomplished by making a fractional change in the length of the laser's resonator in the same ratio. This implies that shorter resonator lengths will require a proportionally smaller change in the resonator length to produce the same range of frequency sweep. For the previously described exemplary laser system with a resonator optical path length of 3.15 mm, the required change in the optical path length is 3.15/224,000, which equals approximately 14 nm. Such a small change in optical path length may be readily accomplished using any one of the previously described tuning elements.

FMCW LIDAR system may operate over a wide range of frequency modulation depths and frequency scan rates depending on the application. For example, for long distance LIDAR the frequency scan rate is lower, since the frequency sweep needs to be long enough so that the return signal mixes with the still sweeping laser. For a measurement distance of 500 m, longer than required for many vehicle ranging applications, the monotonic frequency scan must extend for at least approximately 3.3 microseconds (a 1 km round trip path divided by the speed of light). Thus, the period between successive upward or downward frequency scans is at least approximately 6.6 microsecond corresponding to a maximum scan rate of approximately 150 kHz. Thus, a frequency scan rate for long distance LIDAR may be in a range of 50 kHz to 500 kHz. Intermediate distance LIDAR can use higher ranges, for example, 100 kHz to 1 MHz, shorter distance LIDAR may use high scan rates, such as 500 kHz to 5 MHz, but there is no requirement to do so. Similarly, the depth of the frequency modulation can vary with the required accuracy. For example, depth of the frequency modulation may be between 500 MHz to 5 GHz, 1 GHz to 10 GHz, or 2 GHz to 20 GHz. Both smaller and larger frequency scan rates and frequency modulation depths may be required in some applications.

For large modulation depth, it may be desirable for the resonator length to be very short, such as in a range between approximately 0.2 to 1.0 mm. Preferably, the resonator length may be between approximately 0.3 to 0.6 mm. The thickness of the gain element may be approximately 0.4 mm. If the gain element is Nd:YVO₄, this gives an optical path length through the gain element of 0.86 mm assuming that the resonant beam 270 is polarized along the c-crystallographic axis. The length of the gap may be less than approximately 20 microns. Assuming a 20 micron gap yields a total resonator length of 0.42 mm and an optical path length in the resonator of 0.88 mm.

For the example give above, a free spectral range of the cavity is approximately 174 GHz, which sets an upper limit on the frequency modulation depth. Again, assuming a lasing wavelength of 1.34 microns, which implies a lasing frequency of approximately 224,000 GHz, the frequency tuning coefficient is approximately 1 GHz per 3.8 nm or 0.26 GHz/nm of optical path length in the resonator. This frequency tuning coefficient rate is almost four times larger than the previous example due to the shorter resonator length. The frequency slew rate is the product of the frequency tuning coefficient and the speed with which the optical cavity length can be varied. A representative speed for a piezoelectric transducer is 0.5 nm/ns. Assuming this piezoelectric transducer speed and a frequency tuning coefficient of 0.26 GHz/nm yields a frequency slew rate of 0.13 GHz/ns. A scan of 1 GHz could thus be completed in approximately 7.7 ns, which is much faster than generally required for LIDAR applications. A high frequency slew rate and large frequency modulation depth may be advantageous in some FMCW LIDAR applications.

The examples given above are exemplary only and are meant to be illustrative and not limiting with regards to the frequency scan rate, frequency modulation depth, and frequency slew rate. System designers may substantially vary these parameters depending on the application. A waveform of the frequency scan may take different forms. A triangle variation of the frequency is convenient, since the magnitude of the frequency offset is linearly proportional to time, but other types of waveforms, for example, a sine wave, may be used. Some FMCW laser ranging systems may require frequency modulation depths on the order of 1 GHz, with the pattern of the variation being a triangle waveform with a scan frequency on the order of 1 MHz.

Any if the previously described laser systems may have an isolator positioned in the output beam 260. The isolator provides optical isolation between the laser resonator and reflections from the surrounding environment. Reflections from the surrounding environment may impact the frequency stability of the output beam 260. By placing an isolator in the output beam, its frequency stability may be increased, which improves the accuracy and reliability of the laser ranging system. In other words, there may be less undesired frequency jitter associated with each scan of the output beam frequency. Each successive frequency scan, be it either an upward or downward scan, may be more nearly identical.

It may also be advantageous to provide some type of vibration isolation for the mounting any of the previously described laser systems. In operation, mechanical vibrations from the surrounding environment may induce undesirable frequency jitter. By mounting the laser system to minimize transfer of environmental vibrations into the laser system, the frequency stability of the output beam may be improved.

The laser system has been described as operating in a wavelength range between 1.2 to 1.4 microns; however, the invention is not so limited. The laser system may operate in other in other wavelength ranges, such as between 0.9-1.2 microns and 1.4-2.0 microns. In particular, the laser system may operate in an eye-safe wavelength range with wavelengths greater than 1.2 microns. The gain element host material need not be $YVO_4$ but can be any suitable crystalline or glass material. Likewise, the dopant need not by neodymium (Nd), but can be any suitable dopant such as erbium (Er), holmium (Ho), ytterbium (Yb), praseodymium (Pr), thulium (Tm), dysprosium (Dy) or any other suitable rare-earth element. In particular, erbium doped gain elements may operate in a wavelength range between 1.5 to 1.6 microns.

A variety of laser resonators, lasers, and laser ranging systems have been previously described in the present application. Similarly, methods of operating these elements and systems to determine a distance between a laser ranging system and a target have been previously described. Some embodiments of systems and methods are summarized below.

In an embodiment, a laser system having a resonator with a first and an opposed second end is described. The resonator has a gain element positioned in the resonator and the gain element has a first and an opposed second surface. A tuning element is arranged to vary an optical path length between the first and second end of the resonator. A control signal is applied to the tuning element to vary the optical path length in the resonator, which varies an output frequency of an output beam of the laser system.

In another embodiment, a laser system is configured to output a plurality of laser beams. The laser system includes a gain element having a first and a second surface. The first surface has a highly reflective coating at a lasing wavelength to form a first end of a resonator. A second end of the resonator is formed by a second surface having a partially transmitting optical coating at the lasing wavelength. A tuning element is arranged to vary an optical path length between the first end and the second end of the resonator. The laser is energized by a pump source. The pump source is a multiple emitter pump source having a plurality of emitters on a monolithic semiconductor die.

In another embodiment, a laser system configured to output an output beam is described. The laser system has a gain element having a first and a second surface. The first surface has a highly reflective coating at a lasing wavelength to form a first end of a resonator. A second end of the resonator is formed by a second surface having a partially transmitting optical coating at the lasing wavelength. A tuning element is arranged to vary an optical path length between the first end and the second end of the resonator. The laser system further includes an amplifier and a pump source. The pump source has a pump beam directed to the first surface of the gain element. A portion of the pump beam is transmitted by the gain element and pumps the amplifier.

In another embodiment, a laser system configured to output an output beam is described. The laser system has a gain element having a first and a second surface. The first surface has a highly reflective coating at a lasing wavelength to form a first end of a resonator. A second end of the resonator is formed by a second surface having a partially transmitting optical coating at the lasing wavelength. A tuning element is arranged to vary an optical path length between the first end and the second end of the resonator. The laser is energized by a pump source. The pump source is a multiple emitter pump source having a plurality of emitters that are spatially combined to pump a single pump spot on the gain element.

In another embodiment, a laser ranging system is described. The laser ranging system includes any of the laser systems recited herein and a mixing detector that heterodynes a reference signal from the laser system with a return signal from a target to form a beat signal.

In another embodiment, a method of determining a distance between a platform and a target is described. The method uses any of the laser systems recited herein mounted on the platform. A frequency of an output beam is scanned in an upward or downward manner. A portion of the output beam is diverted to a mixing detector to form a reference signal. A return signal is received in the mixing detector. The return signal is heterodyned with the reference signal to form a first beat signal. The frequency of the output beam is scanned in an opposite manner. A portion of the output beam is diverted to a mixing detector to form a reference signal. A return signal is received in the mixing detector. The return signal is heterodyned with the reference signal to form a second beat signal. An average of the first beat and second beam signals is used to determine a distance between the platform and the target.

In still other embodiments, a laser ranging system is mounted on a platform. The laser ranging system includes a frequency-modulated continuous-wave laser. The platform may be a moving platform or may be a stationary platform. The laser beam is scanned so that a distance between multiple targets in the field of view may be determined.

Although only a few embodiments of the invention have been described in detail, it should be appreciated that the invention may be implemented in many other forms without departing from the spirit or scope of the invention. The invention has been described primarily as a laser ranging system for a vehicle; however, the ranging system may be used in other platforms. The ranging system may be used in other moving platforms, such as a locomotive, ship, airplane, or unmanned drone. It may also be used in stationary applications, such as to determine the shape and layout of a structure, such as a building, bridge, or industrial facility, or to observe moving vehicles from a fixed location, such as a traffic intersection or airport taxiway. The resonator has been described as having only a single gain element; however, the resonator may contain multiple gain elements. Such a structure may be helpful is dissipating waste heat. One end of the resonator has been described as being located on a first surface of the gain element; however, in alternative embodiments, both surfaces of the gain element may be antireflection coated at the laser wavelength and a separate cavity element may form an end of the resonator. In further embodiments, the partially reflective output coupler may be placed on a surface of the gain element and the gain element is pumped by a pump beam directed through another element in the resonator. Alternatively, the gain element may have an undoped cap, an outer surface of which forms an end of the resonator. Therefore, the present embodiments should be considered illustrative and not restrictive, and the invention is not to be limited to the details given herein.

What is claimed is:

1. A laser system comprising:

a resonator having a first and an opposed second end;

a gain element positioned in the resonator having a first surface and an opposed second surface, wherein the first surface of the gain element has a reflective coating at a lasing wavelength to form the first end of the resonator;

an output coupling element having a first surface and an opposed second surface, one of the first or second surfaces having a partially reflective coating at the lasing wavelength to form the second end of the resonator;

a tuning element arranged to vary an optical path length between the first and second end of the resonator;

a semiconductor laser arranged to generate a pump beam directed into the gain element;

a beam splitter arranged to split off a portion of an output beam of the resonator;

a monitor arranged to intercept the split-off portion of the output beam so as to provide an electrical signal proportional to an optical power incident on the monitor; and a controller, wherein the electrical signal is input into the controller and the controller is arranged (i) to supply a modulation voltage to the tuning element to scan a frequency of the output beam, (ii) to supply an offset voltage to the tuning element to maintain single frequency operation of the laser system over the frequency scan of the output beam caused by application of the modulation voltage, and (iii) to vary a drive current to the semiconductor laser in a feed forward manner to improve an amplitude stability of the output beam.

2. The laser system as recited in claim 1, wherein the offset voltage is controlled to minimize the variation in the drive current to the semiconductor laser necessary to improve the amplitude stability.

3. The laser system as recited in claim 1, wherein a power of the output beam is in a range between approximately 0.5 W to 3 W.

4. The laser system as recited in claim 1, wherein the tuning element is situated in a gap between the gain element and the optical coupling element.

5. The laser system as recited in claim 1, wherein the tuning element is comprised of an inner member, an outer member, and an end cap connecting the inner member to the outer member.

6. The laser system as recited in claim 5, wherein a length of the inner member varies in response to the offset voltage and modulation voltage.

7. The laser system as recited in claim 5, wherein the inner member is selected from a group consisting of a voice coil, a piezoelectric transducer, and a micro-electromechanical system (MEMS).

8. The laser system as recited in claim 1, wherein the lasing wavelength is an eye-safe wavelength greater than or equal to approximately 1200 nm.

9. The laser system as recited in claim 1, wherein the optical path length between the first and second end of the resonator is in a range of approximately 0.2 mm to 1 mm.

10. The laser system as recited in claim 1 further comprising a nonlinear optical element situated in the resonator arranged to convert a lasing wavelength of the resonator to another optical wavelength.

11. The laser system as recited in claim 1 wherein the pump beam is in a wavelength range from approximately 875 to 890 nm.

12. The laser system as recited in claim 11 wherein a wavelength of the pump beam is narrowed and stabilized by a grating.

13. The laser system as recited in claim 1, wherein the second surface of the gain element and the first surface of the output coupling element are separated by less than approximately 20 microns.

14. The laser system as recited in claim 1, wherein a rate of the frequency scan of the output beam is in a range between approximately 100 kHz and 1 MHz.

15. The laser system as recited in claim 1, wherein a modulation depth of the frequency scan of the output beam is in a range between approximately 1 GHz and 10 GHz.

16. The laser system as recited in claim 1, wherein the optical coupling element and the tuning element are a common element.

17. The laser system as recited in claim 1, wherein the mass of the optical coupling element is a range between approximately 0.01 to 2 milligrams.

18. A laser ranging system comprising:

the laser system as recited in claim 1; and a mixing detector that heterodynes a reference signal from the laser system with a return signal from a target to form a beat signal that is used to determine a distance between the laser ranging system and the target.

19. The laser system as recited in claim 1, wherein the semiconductor laser is a multiple emitter pump source configured to generate a plurality of pump beams that spatially overlap in a common pump spot in the gain element to form a combined pump beam.

* * * * *